United States Patent [19]

Wollermann et al.

[11] Patent Number: 4,879,926
[45] Date of Patent: Nov. 14, 1989

[54] APPARATUS FOR CUTTING, CONVEYING AND PROGRAMMABLY STRIPPING WIRE SEGMENTS

[75] Inventors: Kenneth Wollermann, Mukwonago; Ragnar Gudmestad, Wauwatosa, both of Wis.

[73] Assignee: Artos Engineering Company, New Berlin, Wis.

[21] Appl. No.: 238,590

[22] Filed: Aug. 31, 1988

[51] Int. Cl.$^4$ .............................................. H02G 1/12
[52] U.S. Cl. ..................................................... 81/9.51
[58] Field of Search ................................... 81/9.4, 9.51

[56] References Cited

U.S. PATENT DOCUMENTS 4,672,871  6/1987  Gudmestad ........................... 81/9.51

FOREIGN PATENT DOCUMENTS 1434464  5/1976  United Kingdom ................. 81/9.51

Primary Examiner—Roscoe V. Parker
Attorney, Agent, or Firm—James E. Nilles; Donald C. McGaughey

[57] ABSTRACT

A programmable wire stripper is provided for cutting and stripping selectively variable length insulation portions from the end of wire segments presented at a workstation. The stripper includes a base frame mounted in fixed relation to the workstation and a carriage mounted on the base frame for movement toward and away from the workstation by a first drive. A turret is mounted on the carriage for movement relative thereto. The turret has a plurality of individual mounting positions and an insulation cutting mechanism is mounted on the turret at each of the mounting positions for movement between open noncutting and closed cutting positions. A second drive is provided for moving the turret to place any selected mounting position and its associated cutting mechanism at the workstation. A first actuator is provided to effect closing of the cutting mechanism. A gripper is provided on the carriage and movable between open nongripping and closed gripping positions and a second actuator is provided for effecting movement of the gripper between the open and closed positions. A third actuator is provided on the carriage for moving the gripper toward and away from the workstation.

33 Claims, 21 Drawing Sheets

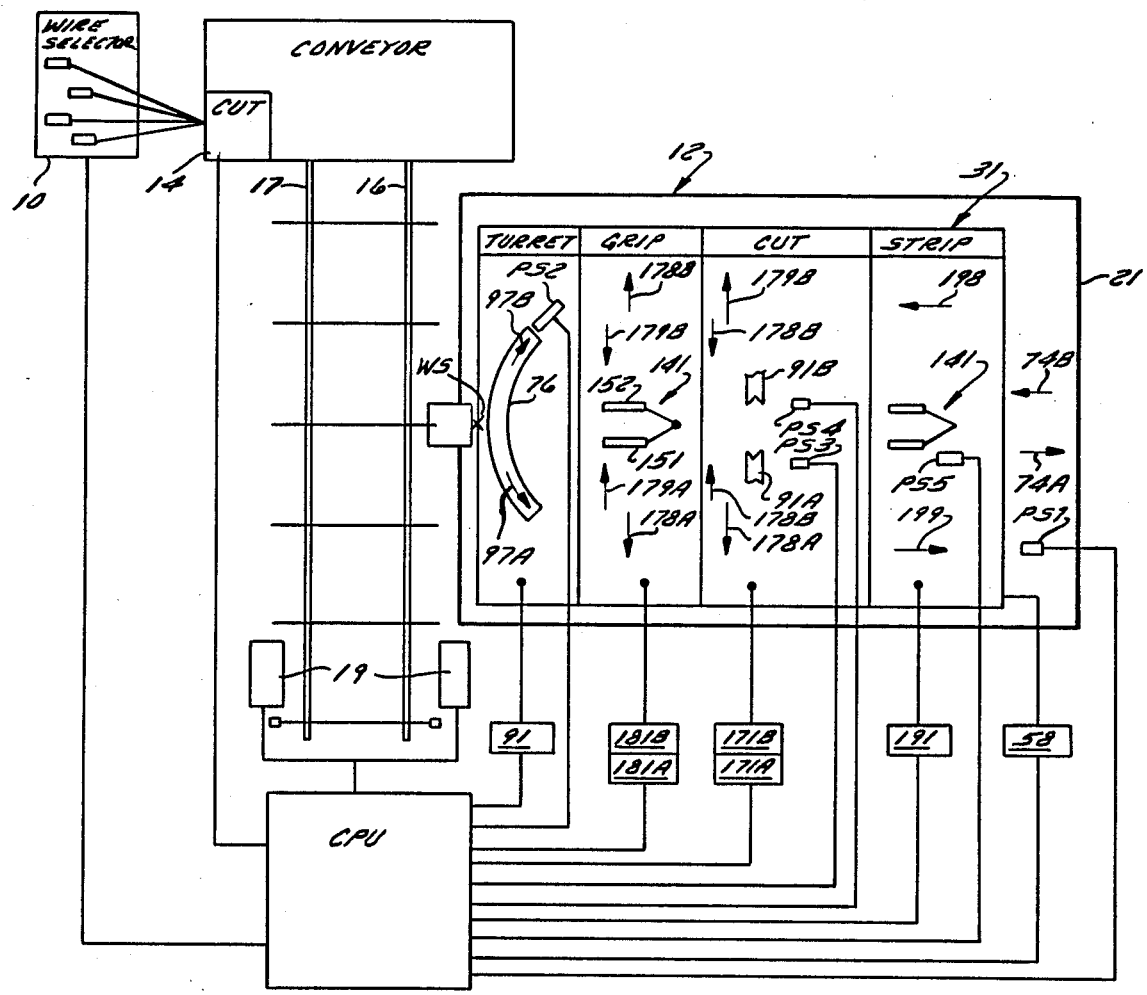

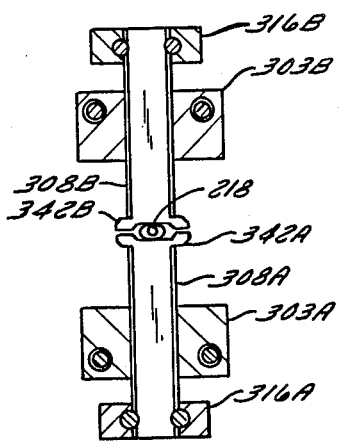
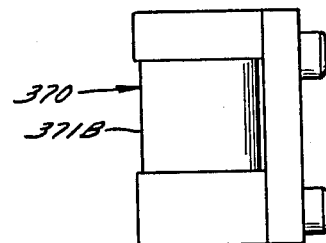
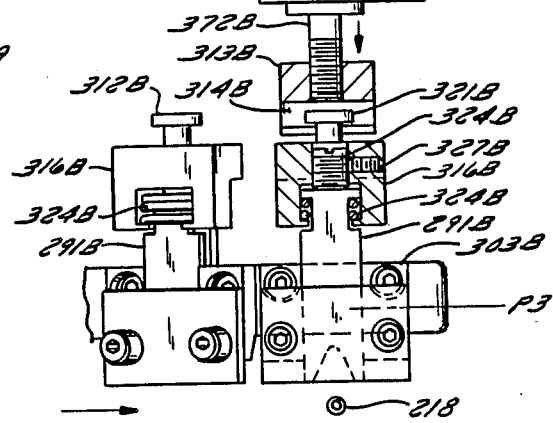
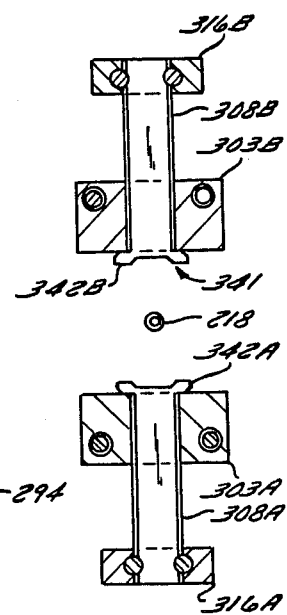
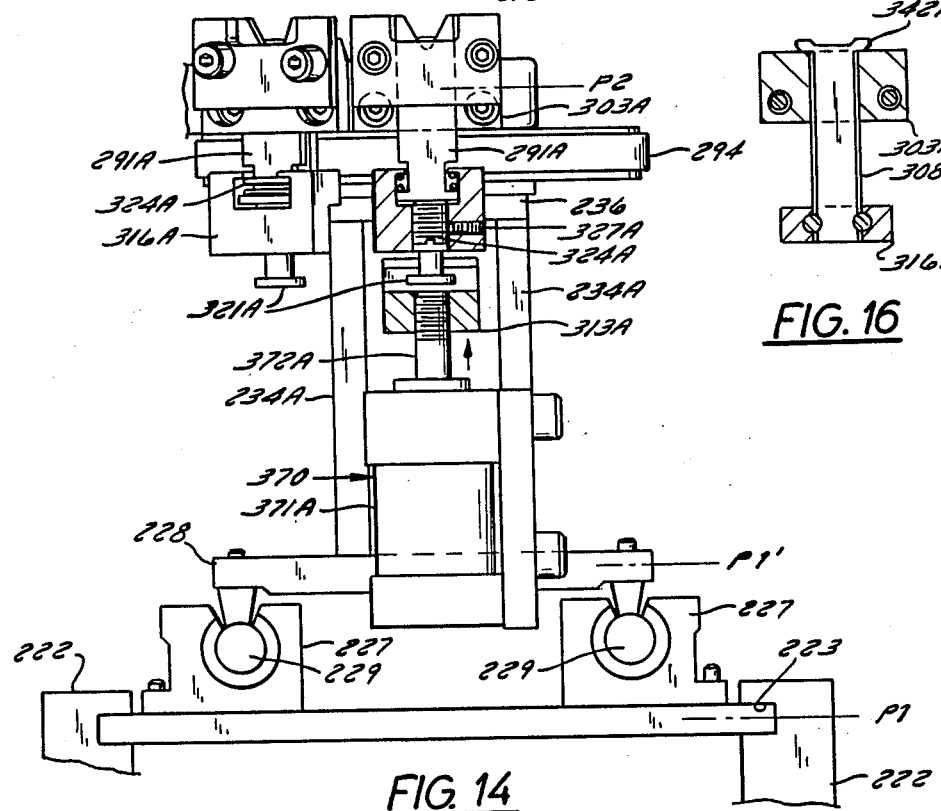
FIG. 17
FIG. 16
FIG. 14

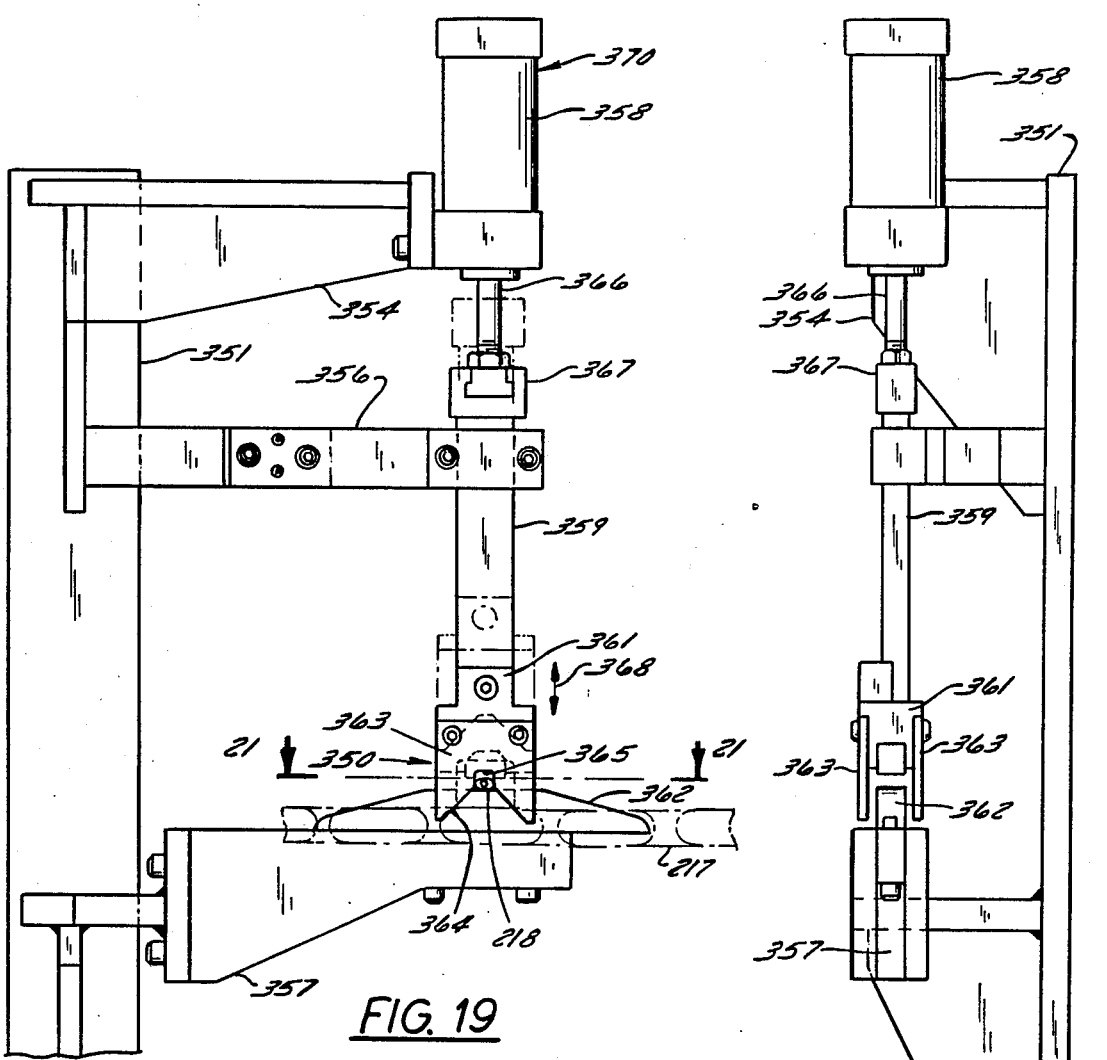
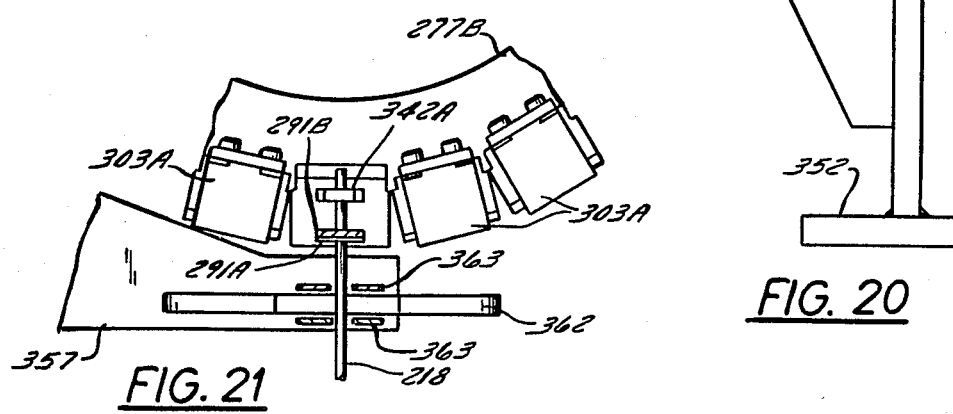
FIG. 19
FIG. 20
FIG. 21

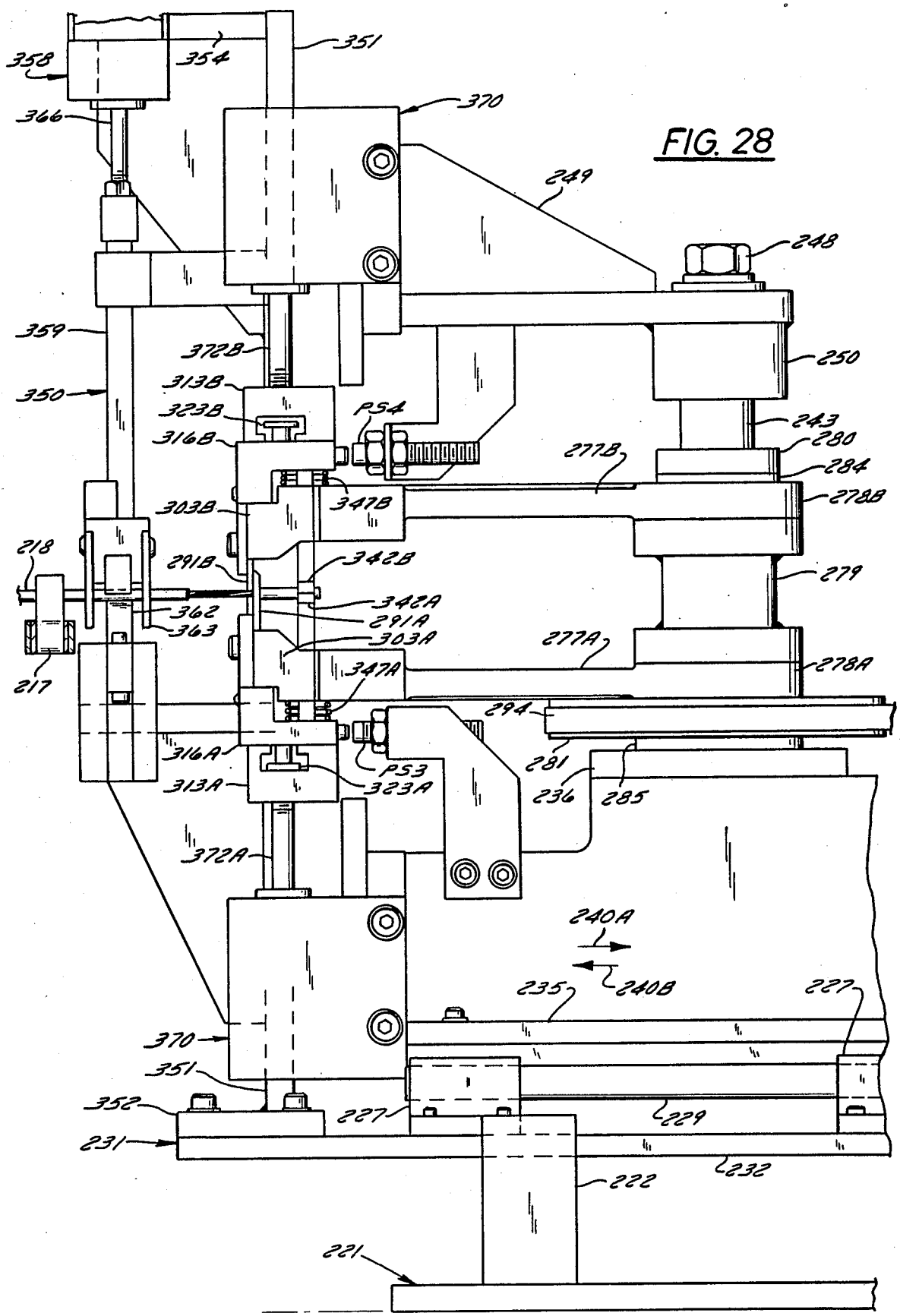

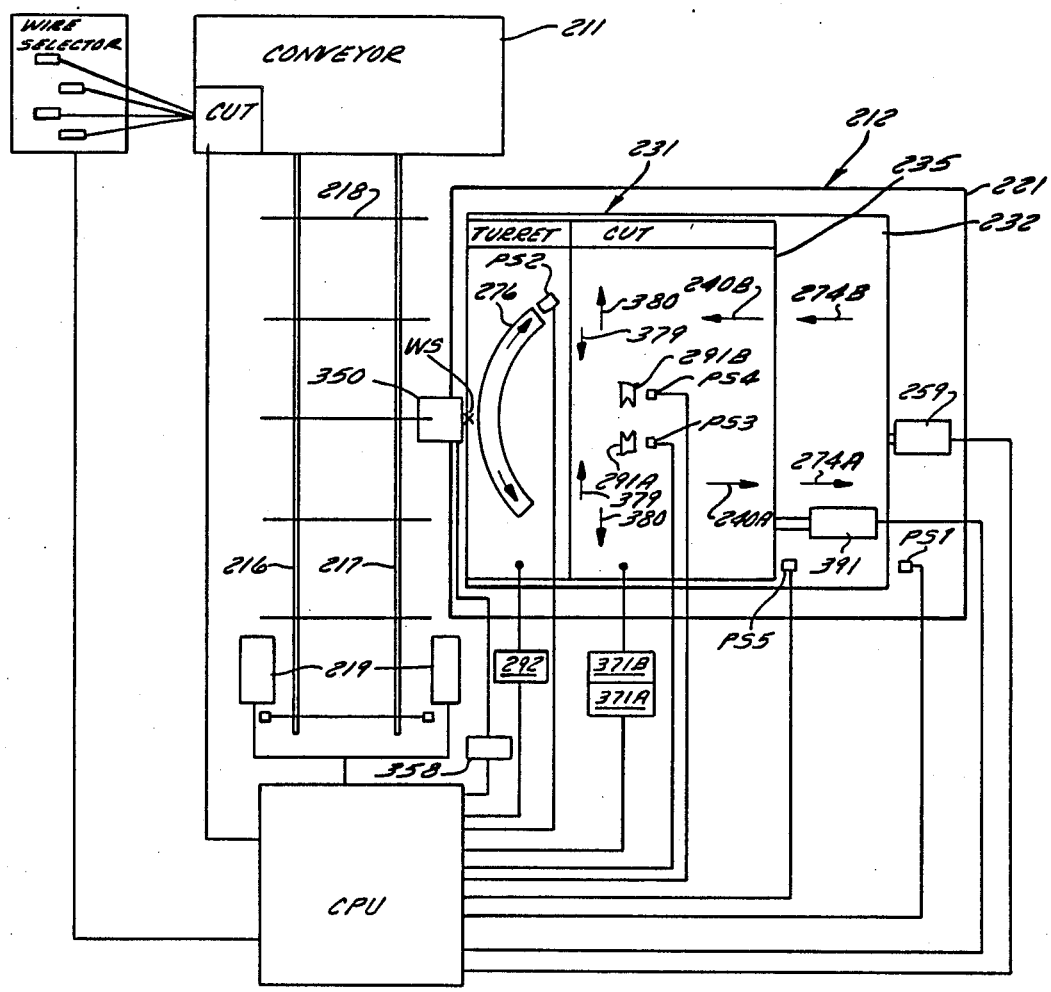

APPARATUS FOR CUTTING, CONVEYING AND PROGRAMMABLY STRIPPING WIRE SEGMENTS

BACKGROUND OF THE INVENTION

1. Field of the Invention

This invention relates generally to an apparatus for cutting, conveying and stripping segments of wire and more particularly to a programmable wire stripper therefor that will automatically strip preselected variable length insulation portions from the ends of precut wire segments having conductors of the same or differing gauge.

2. Description of Prior Art

In industry there are many applications requiring large numbers of wire segments cut to predetermined lengths with the insulation portion cut, or cut and stripped from the ends thereof and with a suitable end terminal applied. There is a need for batches of individual wire segments all having the same gauge but with the gauge varying from batch to batch and also a need for sets of precut insulated wire segments having conductors of the same or differing gauge with each set to be assembled into a wiring harness. More specifically a precise length of insulation at the end of each wire segment is transversely cut and then stripped from the conductor following which the connector terminals that are required are attached. For some applications the ends of the wire segments may have the insulation cut but not removed in order to protect the ends of multiple wire strand conductors from fraying during shipping.

It is known in the prior art to automatically cut wire segments from several wire spools containing continuous wire coils of differing gauges. The wire segments for a complete harness, for example, are cut in a predetermined sequence, to form one complete harness set and then fed in sequence onto a conveyor mechanism which comprises two laterally spaced apart conveyor units, one of which can be adjusted relative to the other to accommodate wire segments of varying lengths. The conveyor mechanism sequentially carries the cut wire segments to a wire stripping workstation or workstations where the wire stripper cuts the insulation and then strips an insulation slug portion from one or both ends of each wire segment leaving a bare conductor of the desired length.

In the cutting operation, the insulation is cut through transversely of the conductor as completely as possible prior to pulling off the insulation portion using a pair of opposed face-to-face stripping knives which are reciprocated toward and away from the opposite sides of the conductor. Each knife has one or more V-shaped cutting edge profiles (two cutting profiles if two wires are simultaneously stripped) and as the knives are in face-to-face relation their cutting edges coact to define a generally diamond shaped cutting profile which partially surrounds the insulation when the knives are brought together. The conductors are generally circular in cross-section and the stripper knives are set so that when they close they will stop before they actually cut into the wire. This setting, which limits the closing of the knives, is important especially where the conductor comprises a plurality of fine strands of wire. If some of the strands are cut they will be removed with the insulation slug and the rated current carrying capacity of the conductor will be reduced. Further, any cutting or even nicking of the wire will create a weak area which is subject to early fracture when the end of the wire segment is flexed or bent as the wire segment or harness is being installed.

In a stripping operation with V-shaped knives as above described, the insulation sheath is only cut at four points on the periphery of the conductor and indeed may not be quite completely cut through at any point. When the insulation slug portion is removed by pulling it axially off the wire conductor, the insulation is stretched until it tears free at the weakened or cut area. This stretching of insulation frequently results in the insulation which is retained on the wire segment, also stretching to the degree where it will take a set in a stretched out position. This permanent stretching of the insulation is referred to as "milking". When milking occurs, the lengths of the bare stripped portion of the conductor will vary depending on the amount of set that the insulation takes on the wire segment. Uneven lengths of stripped conductors are undesirable because they will cause problems in attaching the ends of terminals which are pre-sized to receive precisely the same lengths of bare conductor in order to permit their automatic attachment to the wire segment.

In an effort to minimize the problem of milking insulation it is known to twist the insulation slug portion before pulling it axially off the wire, but this requires a more complex mechanism. It is also known to grind the cutter knives so that the apex of their V-shaped profile is in the form of a semicircle having a diameter which is slightly greater than the diameter of the conductor so that the insulation will be cleanly cut around its entire periphery while the wire conductor itself will not be nicked or cut. When the apex of the cutter knife is semicircular in profile, the knife is, as a practical matter, only usable for the one specific gauge of wire it was ground to fit. If the degree of closing of the opposed knives is set to accommodate either larger or smaller gauge conductors, the cutter profile of two mating knives no longer forms a true circle and significant amounts of insulation will remain unsevered. When insulation is unsevered, the milking problem will exist or the cut insulation portion will adhere so tightly to the remaining insulation on the wire segments that it will not tear free, but will instead slip out from between the gripping jaws as they withdraw, thus allowing insulation to remain on the end of the wire segment. Insulation portions which remain on the wire segment will disrupt the operation of the terminal applying machine just as uneven lengths of stripped bare conductors will.

From the foregoing it will be understood that a manufacturer of wire segments requires a high speed apparatus to cleanly and quickly strip wires that are in a set having differing gauges of conductors at a single workstation, or to strip the wire segments in batches, with each batch being all of the same gauge but with the wire gauge varying from batch to batch. However, as such wire segments can be cut at an extremely high rate of speed it is undesirable to shut down the stripper in order to change knives or knife settings to accommodate batches of wire segments of differing gauges. An even more difficult problem exists where a plurality of wire segments are being cut to form a set for the purpose of assembly into a wire harness as it is then necessary for the stripper to adjust back and forth between individual wire conductors of differing gauges almost instantly. In addition, it is necessary that the length of the stripped off insulation portion of each wire segment also be variable in order to accommodate different types of end terminals. In theory it is possible to program a single set of knife closings to vary between one of a plurality of closing dimensions which would be keyed to a sequence of different gauges of wire presented at the workstation. However, this type of practice presents at least two problems. First, in order to program the degree of closing of the knives it is necessary to use a cutter ground with a sharp apex notch and therefore the insulation sheath will not be scored or cut completely around its periphery thus causing milking problems when the cut insulation portion is removed. Second, because such equipment is operating at an extremely high rate of speed through millions of cycles it is extremely difficult in practice to constantly maintain the close tolerances for variable position stop means necessary to prevent cutting into the conductor over a long period of time in spite of wear.

Thus, the problem which has not been successfully solved in the prior art is how to provide a stripping apparatus which will present a plurality of wire segments at a workstation where a stripper will be able to strip lengths of insulation from the ends of wire segments, each of which may have a different gauge conductor at an extremely high rate per minute without incurring the problem of milking the insulation or nicking or scraping the conductor while also providing a practical way of varying the length of the stripped portion of insulation from conductor to conductor so as to accommodate various differing styles of wire terminals. It is appreciated by those skilled in the art that if even one end of the plurality of wire segments is not cleanly stripped of insulation to a precise length, the automatic terminal applying machine will be disrupted resulting in the wire segment or entire wiring harness becoming defective. In such event, the entire automated production line is frequently required to be shut down until the problem is corrected. Such shutdowns result in high expense due to labor costs and lost production.

SUMMARY OF THE INVENTION

The object of the present invention is to provide an improved apparatus for cutting and conveying insulated wire segments having conductors of the same or differing gauges to a workstation and to provide an improved stripper for removing variable length insulation portions from the ends of such wire segments which is rugged in construction, economical to manufacture and reliable in high speed operation. Two embodiments of the invention are disclosed.

In both embodiments, the apparatus for cutting, conveying and removing variable length insulation portions from the ends of the wire segments comprises: a means for cutting said wire segments having same or differing gauge conductors, a conveying means for conveying said cut wire segments and presenting said ends at a workstation, and a programmable wire stripper mounted at said workstation. The programmable stripper includes: a base frame mounted in fixed relation to the workstation, a carriage mounted on the base frame for movement in a first plane to strip length positions closer or farther from the workstation, a first drive means operatively interposed between the base frame and the carriage for moving the carriage to a predetermined one of the strip length positions, a turret mounted on the carriage for movement relative thereto and having a plurality of mounting positions, and an insulation cutting means mounted on the turret at each of said mounting positions and movable between open insulation noncutting and closed insulation cutting positions. A second drive means is provided for selectively moving the turret relative to said carriage to place any selected one of the cutting means when in the open noncutting position at the workstation. A first actuating means is provided for effecting cutting movement of the cutting means to the closed cutting positions to transversely cut through the insulation and create a cut portion of insulation at the end of said wire segment. A gripping and guiding means is mounted on said carriage and is movable between open and closed positions. A second actuating means is provided for effecting selective movement of the gripping and guiding means to the open and closed positions. A third actuating means is provided for effecting movement of the gripping means toward said workstation when said gripping means is in said open position and away from said workstation when said gripping means is in said closed position.

In the first embodiment, the programmable stripper includes a base frame which is mountable in fixed relation to the workstation where the end of the wire segment is presented. A carriage is mounted on the base frame for movement in a first plane toward and away from the workstation. A first drive means is operatively interposed between the base frame and the carriage for moving the carriage to positions closer or farther away from the workstation as required by the length of the insulation portion which is to be cut or cut and stripped. A turret is mounted on the carriage for movement relative to the carriage and the turret has a plurality of individual mounting positions. Insulation cutting means including a knife member is mounted on the turret at each of the mounting positions. The cutting knife member has an open noncutting position. A second drive means is provided for selectively moving the turret relative to the carriage to place any selected one of the cutting means while in the open position at the workstation. A first actuating means is provided for effecting cutting movement of the cutting means to a closed position to transversely cut the insulation on the wire segment and create a cut portion of insulation at the end of the wire segment. A gripping and guiding means is mounted on the carriage and movable between an open position and closed position. A second actuating means is provided for effecting movement of the gripping and guiding means between the open and closed positions. A third actuating means is provided for effecting movement of the gripping and guiding means toward the workstation when the gripping and guiding means are in the open, nongripping position and away from the workstation when the gripping and guiding means are in a closed gripping position.

The stripper turret comprises a sector which is mounted on the carriage for movement about a pivot axis. The sector has a radially outward facing circumferencial portion and the plurality of individual mounting positions are located on the circumferencial portion. The turret sector is mounted for movement about a pivot axis that extends at an angle to the first plane in which the carriage moves. More specifically, the sector lies in a second plane which is in spaced parallel relation to the first plane.

The sector further comprises a pair of spaced apart lower and upper sectors which are mounted on the carriage for pivotal movement in unison. The lower sector is positioned on the carriage to present lower mounting positions below the workstation and the upper section is positioned on the carriage to present upper mounting positions above the workstation as the upper carriage is pivoted. Lower and upper mounting positions on the lower and upper sectors are in vertical alignment with each other. The insulation cutting means includes a lower knife at each of the lower mounting positions on the lower sector and an upper knife at each of the mounting positions on the upper sector. The stripper also includes a knife mounting means for mounting the knives for reciprocal movement toward and away from each other and a knife stop means for limiting the reciprocal movement of the lower and upper knives toward each other when the first acuating means is energized.

More specifically, the knife mounting means at each of the mounting positions includes a guide means on the sector, a slide member mounted on the guide means for reciprocal movement between the open noncutting and closed cutting positions of the knives, a knife attaching means on the slide member for securing the knife member thereto, a knife guide means mounted on the sector at each of the mounting positions for guiding the reciprocating knife, a first stop means for determining the open noncutting position of the slide member, a slide member biasing means for biasing the slide member against the first stop means and a second stop means for limiting reciprocating movement of the knives toward each other to the closed cutting position.

The first stop means comprises a retainer pin aperture in the sector adjacent each of the mounting positions, a slide member retainer pin having first and second portions, with the first portion slidably mounted in the retainer pin aperture in the sector and the second portion secured to the slide member. The slide member has a biasing means comprising a compression spring that surrounds each of the retainer pins between the slide member and the sector.

The means for attaching the knife member to the slide member comprises a mortice on one of the members and a mating tenon on the other of the members.

The lower and the upper guide means for the lower and upper slide members comprise a pair of lower apertures passing through the lower segment and a pair of upper apertures passing through the upper sector, respectively, with the lower and upper pairs of apertures being in alignment with each other. The lower guide member includes lower slide pin means and the upper slide member includes upper slide pin means. The lower slide pin means extend through the lower apertures and have lower free ends terminating in a space between the lower and upper sectors and the upper slide pin means extend through the upper apertures and have upper free ends terminating in the space between the upper and lower sectors in face-to-face relation with the lower free ends so that the lower and upper free ends are contactable with each other during their reciprocal movement of the lower and upper guide members to constitute the knife stop means. At least one of the slide pin means is adjustably mounted in its associated slide member for movement toward and away from the slide member in order adjust the cutting gap between the reciprocating knives.

The gripping and guiding means is mounted between the lower and upper segments and is normally biased to an open position. The second actuating means for effecting movement of the gripping and guiding means includes a lower plunger which is slidably mounted in the lower sector adjacent each of the individual mounting positions and an upper plunger which is slidably mounted in the upper sector adjacent each of the individual mounting positions. The plungers are movable between a first position in contact with the gripping and guiding means to move the gripping and guiding means to the closed position and a second position allowing the gripping and guiding means to assume the open position. A plunger biasing means is provided for normally biasing each of the plungers to the second position.

More specifically the stripper carriage includes a lower portion, a shaft mounted on the lower portion to project therefrom, an upper portion mounted on the shaft in spaced relation to the lower portion, and a turret which includes spaced apart upper and lower sectors mounted on the shaft between the upper and lower portions for pivotal movement relative to the shaft. The gripping and guiding means is mounted on the shaft between the lower and upper turret sectors with the gripping and guiding means being movable between open nongripping and closed insulation gripping positions and shiftable toward and away from the workstation. The first drive means is operatively interposed between the base frame and the carriage to move the carriage towards and away from the workstation in response to the length of the insulation portion to be cut. The first actuating means comprises a lower cutting means actuator mounted on the carriage lower portion and an upper cutting means actuator mounted on the carriage upper portion to effect movement of the cutting means between the open noncutting and closed cutting positions. The second actuating means comprises a lower gripping and guiding means actuator mounted on the carriage lower portion and an upper gripping and guiding means is mounted on the carriage upper portion for effecting movement of the gripping and guiding means between the open and closed positions. The third actuating means comprises an actuator mounted on the carriage for effecting movement of the gripping and guiding means relative to the carriage toward and away from the workstation. Preferably the shaft extends from the carriage at a right angle relative to the first plane in which the carriage lies with the lower portion of a carriage extending in a direction towards the workstation and the upper portion of the carriage comprising a cantilever which extends from the shaft in direction parallel to the direction of the lower portion. Each of the sectors has an included arc of 90°. Preferably the lower and upper gripping and guiding means actuators are in vertical alignment with each other and in spaced parallel relation to the shaft means. Preferably the lower and upper cutting means actuators are in vertical alignment with each other and in spaced parallel relation to the shaft means with the upper and lower gripping and guiding means actuators being located between the lower and upper cutting means actuators and the shaft means.

In the second embodiment of the invention, the carriage comprises first and second subframes. The first subframe is mounted on the base frame for movement relative thereto toward and away from the workstation to adjust the length of the insulation slug to be stripped. The second subframe is mounted on the first subframe for movement relative thereto and relative to the base frame toward and away from the workstation to actually strip the insulation slug from the conductor. The first drive means is operatively mounted between the base frame and the first subframe for moving the first and second subframe to positions closer or farther away from the workstation to adjust for the length of insulation which is to be stripped. A turret comprising a pair of spaced apart lower and upper sectors is mounted on the second subframe and preferably the gripping and guiding means is also mounted on the second subframe preferably on the lower and upper sectors. The first and second actuators are mounted on the second subframe of the carriage. The third actuating means is operatively mounted between the first subframe and the second subframe to effect movement of the second subframe and associated gripping and guiding means toward and away from the workstation to strip the cut length of insulation from the end of the wire segment.

In the second embodiment, each sector also has upper and lower mounting portions and a guide means is mounted at each of said mounting portions. The guide means includes a knife guide means and a gripping means guide. A slide member is mounted on the guide means and the slide member has a knife attaching means for securing a knife member thereto. The first actuating means is connected to the slide member. The second actuating means is connected between the slide member and the gripping and guiding means. Energization of the first actuating means will cause the slide member, the knife and the second actuating means to move down to grip the wire and cut the insulation at the appropriate point in the wire segment. An adjustable stop means is provided for limiting the reciprocal movement of the lower and upper knives toward and away from each other.

Preferably the second embodiment will include a wire gathering means mounted on the first subframe at the workstation adjacent the insulation cutting means for movement between an open portion out of contact with the wire segment and a clamping position wherein the wire segment, or segments if there are more than one, is gathered and held in a fixed position. A fourth actuating means is provided for selectively moving the wire gathering means between the open and clamping positions.

BRIEF DESCRIPTION OF THE DRAWINGS

In the drawings:

FIG. 11 is a schematic view of a control circuit for the apparatus;

FIG. 12 shows a timing cycle chart for the first embodiment of the stripper;

FIG. 14 is a partial front elevational view of the second embodiment of the stripper shown in FIG. 13 with some parts not shown for purposes of clarity;

FIG. 16 is a simplified partial elevational view of the stripper taken along line 16—16 of FIG. 26 showing the gripping and guiding means in an open position;

FIG. 17 is a simplified partial elevational view similar to FIG. 16 showing the gripping and guiding means in a closed position;

FIG. 19 is a front elevational view taken along lines 19—19 of FIG. 18;

FIG. 20 is a side elevational view taken along line 20—20 of FIG. 18;

FIG. 21 is a partial top plan view taken along line 21—21 of FIG. 19;

FIG. 28 is a partial side elevational view of the stripper showing the clamping means, knives and gripping and guiding means in the position wherein the insulation portion is withdrawn;

FIG. 29 is a schematic view of a control circuit for the apparatus shown in FIG. 13; and FIG. 30 shows a timing cycle chart for the second embodiment of the stripper.

DESCRIPTION OF THE PREFERRED EMBODIMENTS

Two embodiments of the programmable stripper are disclosed. FIGS. 1–12 show the first embodiment and FIGS. 13–30 show the second embodiment.

First Embodiment

Figure 1:
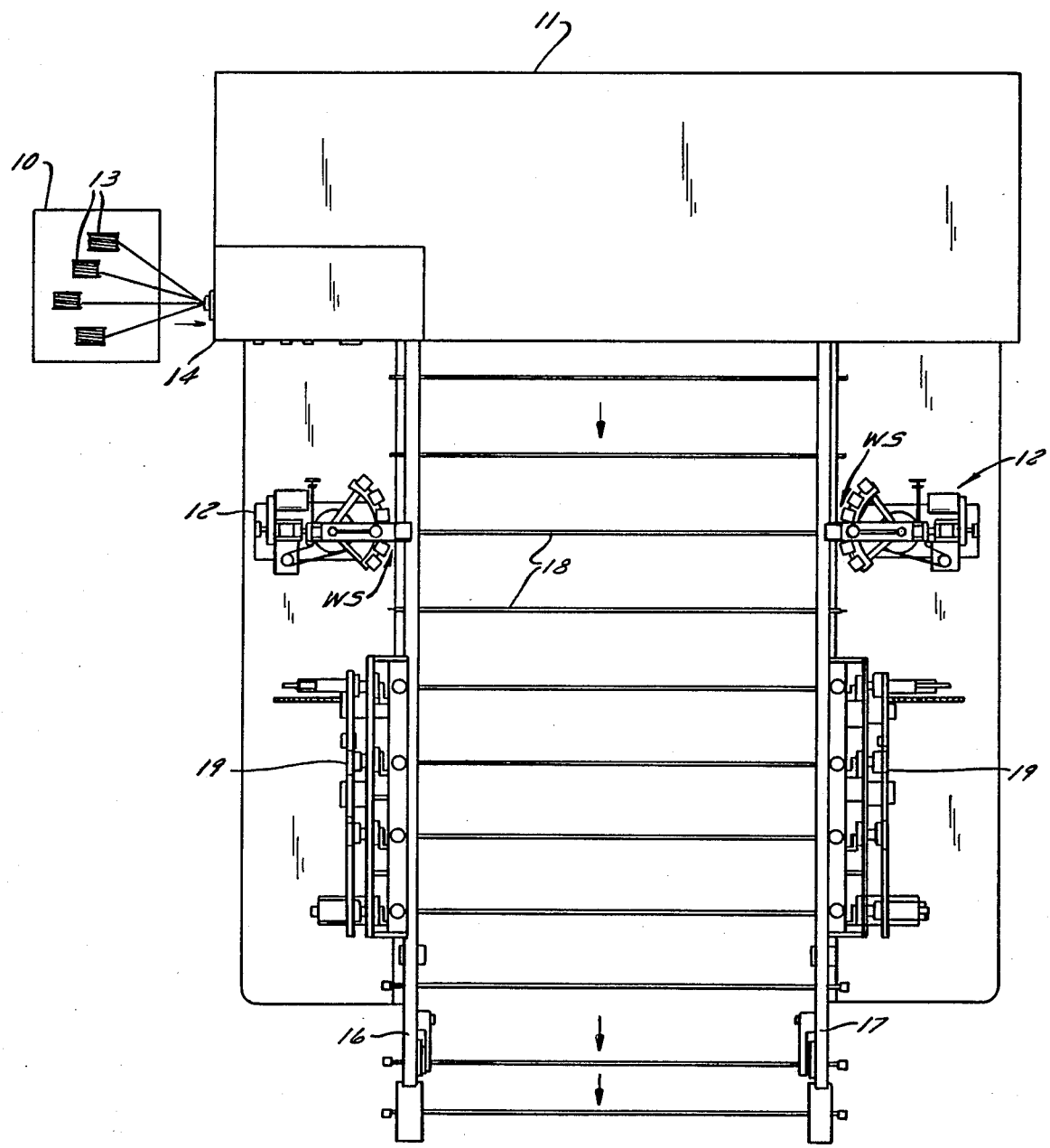
FIG. 1 is a plan view of an apparatus having a wire feeding and cutting means, a conveying means for conveying cut wire segments, a first embodiment of a stripper for removing variable length insulation portions from the ends of the wire segments and a terminal applying machine.

Referring to FIG. 1, the apparatus in accordance with the present invention includes a wire selector/feed mechanism 10, a wire insertion mechanism 14, a conveyor mechanism 11, the first embodiment of the programmable stripper 12 and a terminal applying machine 19. These mechanisms are generally arranged as shown in FIG. 1 and operated in prearranged sequences under the direction of a central processing unit (hereinafter termed CPU) shown in FIG. 11 as will be described in more detail hereinafter.

The wire selector/feed mechanism 10 is provided with a plurality of different wire supply reels 13 containing different gauge wires. The wire selector 10 selects a desired strand and feeds it into a wire insertion mechanism 14 which cuts the wire into a segment and passes it onto the feed end of the conveyor mechanism 11.

The conveyor mechanism 11 comprises two laterally spaced apart conveyor units 16 and 17. One of the conveyor units is stationary and the other is laterally adjustable relative to the stationary unit to accommodate wire segments 18 of different lengths which are transported to a workstation WS at the programmable stripper mechanism 12 and then past terminal applying machines 19 which apply a selected electric terminal to the stripped end of the wire segment. The wire selector/feed mechanism 10, the wire insertion mechanism 14, the conveyor 11, the conveyor units 16, 17 and the terminal applying machine 19 are generally available components per se and will not be described in detail.

Figure 2:
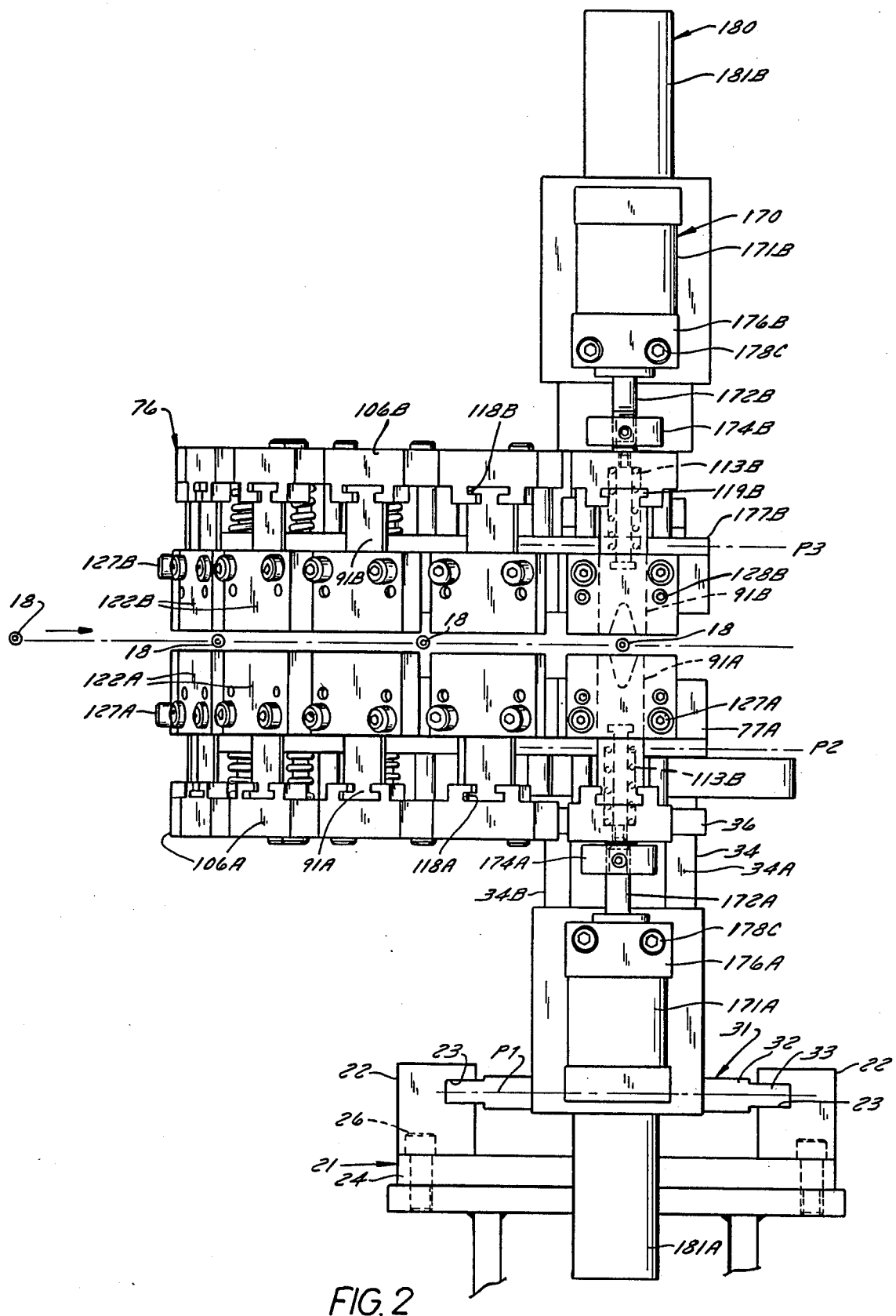
FIG. 2 is a front elevational view of the first embodiment of the stripper shown in FIG. 1.
Figure 3:
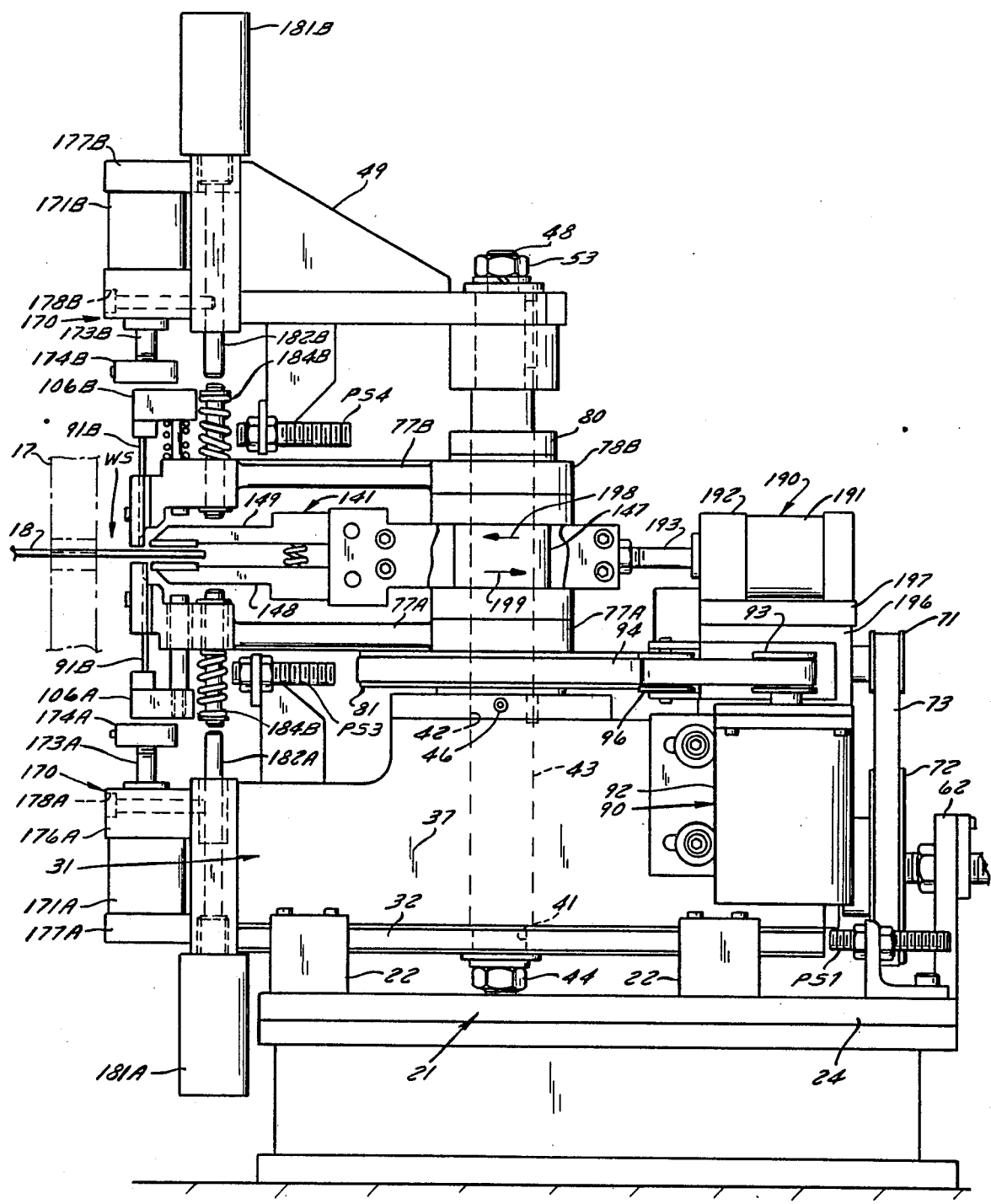
FIG. 3 is a side elevational view of the stripper shown in FIG. 2 with the gripping and guiding means in an open position.
Figure 4:
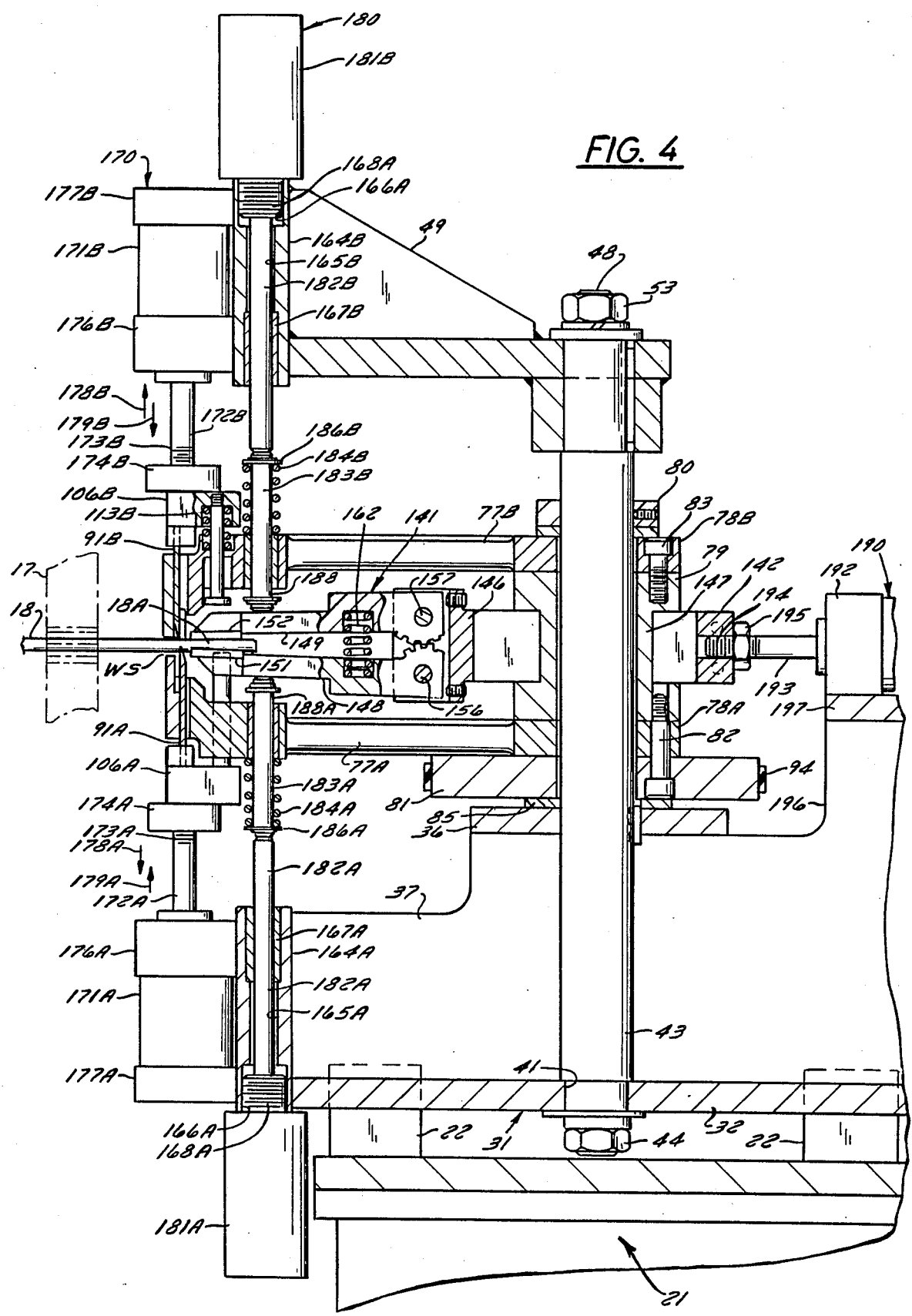
FIG. 4 is a side elevational view similar to FIG. 3 with some parts shown in section and the gripping and guiding means shown in a closed position.

Referring to FIGS. 2, 3 and 4, the programmable stripper 12 comprises a base frame 21 which is adaptable to be secured at a fixed position adjacent to the path of travel of one the conveyor units 16 and 17. The base frame 21 includes a base plate 24 and a plurality of spaced apart block members 22 having horizontal guideways 23 therein. Preferably four block members 22 are used and are secured on the base plate 24 with their guideways 23 facing each other. The block members are removably secured to the base plate 24 by machine bolts 26. The guideways 23 provide a means whereby a carriage 31 is mounted on the base frame 21 for movement toward and away from the workstation WS as best appears in FIGS. 3 and 4.

The carriage includes a slide plate 32 which lies in a first plane P1 and has side rails 33 which mount in the guideways 23 for sliding movement. A proximity sensor PS1 is adjustably mounted on base plate 24 in alignment with slide plate 32. The function of sensor PS1 will be more fully described hereinafter. A main support structure 34, comprising a pair of spaced parallel vertically extending plates 34A and 34B, is rigidly secured to the carriage slide plate 32. A cross member 36 connects the upper freestanding ends of the main support plates 34A and 34B. The carriage 31 includes a lower portion 37, constituted by the main support 34, which extends in a direction toward the workstation WS. The carriage slide plate 32 and the cross member 36 are provided with vertically aligned apertures 41 and 42. A shaft 43 is mounted in the apertures 41 and 42 to extend in an angular relation relative to the carriage 31. Preferably shaft 43 extends at right angles to the first plane in which carriage slide plate 32 lies. The lower end of shaft 43 is externally threaded and is rigidly secured in aperture 42 by means of nut 44. A mid-portion of shaft 43 which passes through the cross member 36 is secured therein by means of a set screw 46. The upper end 48 of shaft 43 is threaded and a carriage upper portion 49 is rigidly mounted thereon. The upper portion 49 is a cantilever which extends in spaced parallel relation to the lower portion 37 and in the same direction as lower portion 37 towards the workstation WS. The upper portion 49 is rigidly mounted in a fixed position on the upper end 48 of shaft 43 by means of nut 53.

Figure 8:
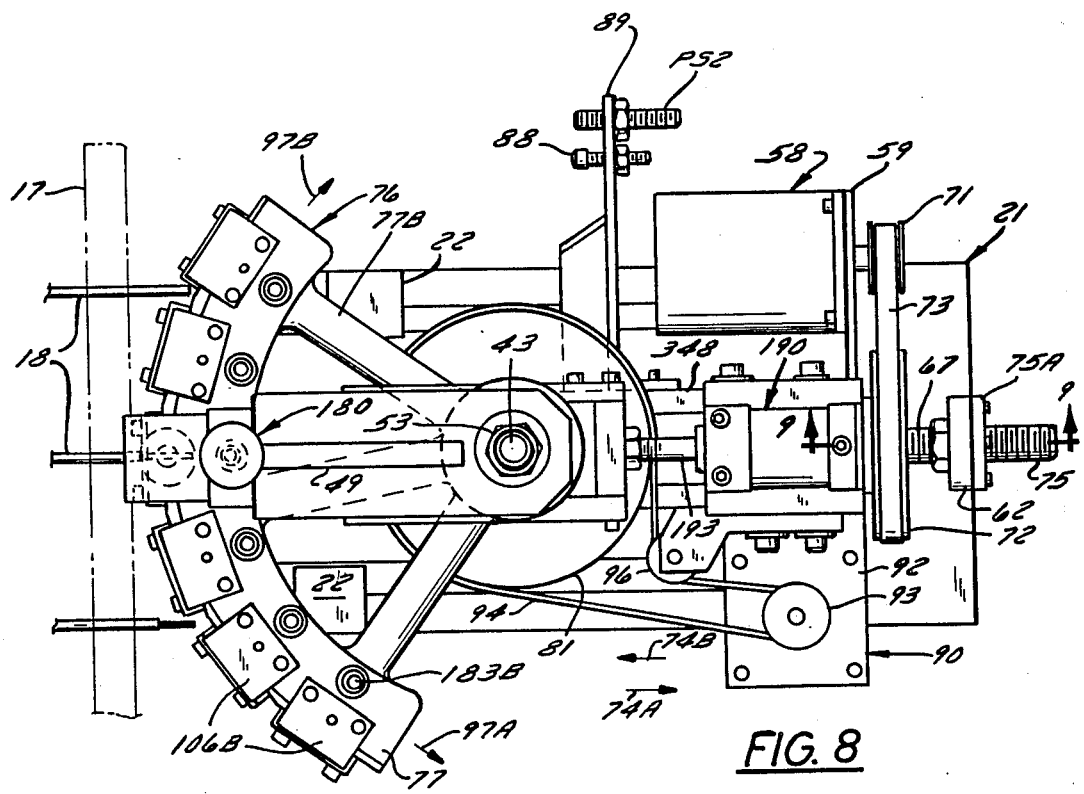
FIG. 8 is a partial top view of the stripper shown in FIG. 7 with the turret sector shown in another operative position.
Figure 9:
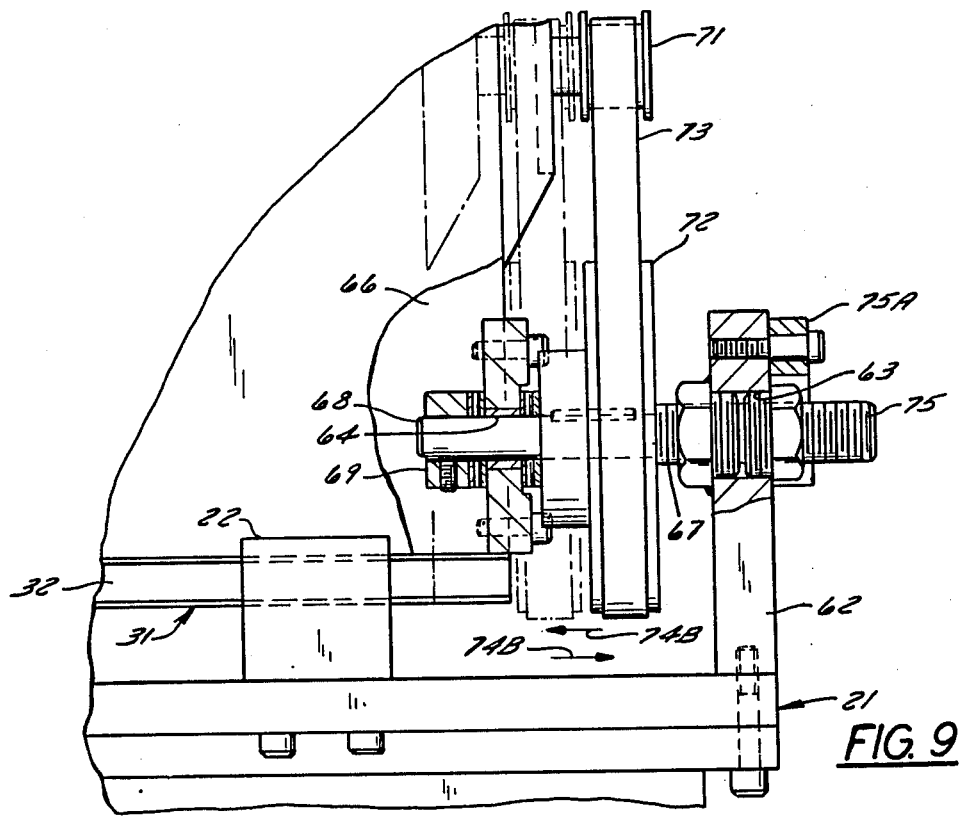
FIG. 9 is a partial side elevation taken along line 9—9 of FIG. 8.

A first drive means 58 best appearing in FIGS. 8 and 9 is operatively interposed between the base frame 21 and the carriage 31. The first drive means 58 includes a step motor which is secured to a flange 59 mounted on main support plate 34B. The base member 21 includes an upstanding arm 62 at the rear portion thereof, as best appears in FIG. 9. The arm 62 has an internally threaded bore 63 which is in alignment with a bearing 64 carried by a rear portion 66 of carriage 31. A drive shaft 67 is threadably engaged in a front portion of the internally threaded bore 63 and has a forward end 68 mounted in the bearing 64. A retainer 69 is secured on the forward end 68 of drive shaft 67 and is in engagement with the bearing 64 to prevent the drive shaft 67 from moving axially relative to carriage 31. A cog tooth drive pulley 71 is mounted on step motor 58 and a cog tooth driven pulley 72 is keyed to drive shaft 67 between the carriage 1 and the base frame arm 62. A positive drive cog belt 73 is trained about pulleys 71 and 72. A stop element 75 is threaded into a rear portion of aperture 63 and secured in any desired position by retainer 75A.

Energization of the step motor 58 will move drive pulley 72 and cause drive shaft 67 to move in and out of threaded aperture 63 within the limits illustrated by the solid and dotted line positions in FIG. 9 thus causing carriage 31 to move toward and away from the workstation WS in the directions indicated by arrows 74A and 74B. The first drive means 58 will place the carriage 31 in positions closer or farther from the workstation WS as required by the length of the insulation portion to be cut from the wire segment at the workstation.

The exact position of the carriage 31 relative to the workstation WS is sensed by a proximity sensor PS1 shown in FIGS. 3 and 11. A variable output signal is fed back by the sensor PS1 to the CPU (FIG. 11) and compared to a desired reference signal stored in the controller. When the desired position of carriage 31 is reached as determined by the comparison of the output signal with the reference signal, CPU will de-energize the step motor 58 and carriage 31 will be stopped at the desired position for the correct strip length.

A turret 76 is mounted on the carriage 31 for movement relative to the carriage. The turret 76 comprises a sector 77 which has an included arc of 90° as is best shown in FIGS. 2, 3, 4 and 7. The sector 77 comprises a lower sector 77A and an upper sector 77B. The lower and upper sectors lie in spaced-apart parallel second and third planes P2, P3 (FIG. 3) which are in spaced parallel relation to the first plane P1 in which said carriage slide plate moves. As best appears in FIG. 4, the lower sector 77A includes a boss 78A having an aperture sized to slidably fit on shaft 43. The upper sector 77B has a similar boss 78B sized to slidably fit on shaft 43. The bosses 78A and 78B are maintained in spaced relation to each other by a spacer sleeve 79. The spacer sleeve includes a guide bushing portion 147 for guiding the reciprocal movement of a gripping means 141 as will be described hereinafter. A drive pulley 81 for moving sector 76 is rotatably mounted on shaft 43 between boss 78A and the cross member 36. The drive pulley 81 for the sector is non-rotatably secured to boss 78A and sleeve 79 by a cap screw 82. Similarily the boss 78B of upper sector 77B is nonrotatably secured to sleeve 79 by a cap screw 83. As the sectors 77A and 77B are both secured in fixed relation to sleeve 79 and driven pulley 81, the sectors will pivot in unison about an axis provided by shaft 43. The sector assembly which has just been described is maintained in a vertically fixed position relative to shaft 43 by means of a retainer ring 80 secured to the upper portion 48 of shaft 43. The retainer ring 80 abut the upper surface of boss 78B. The lower surface of boss 78A rides on a thrust washer 85.

Figure 7:
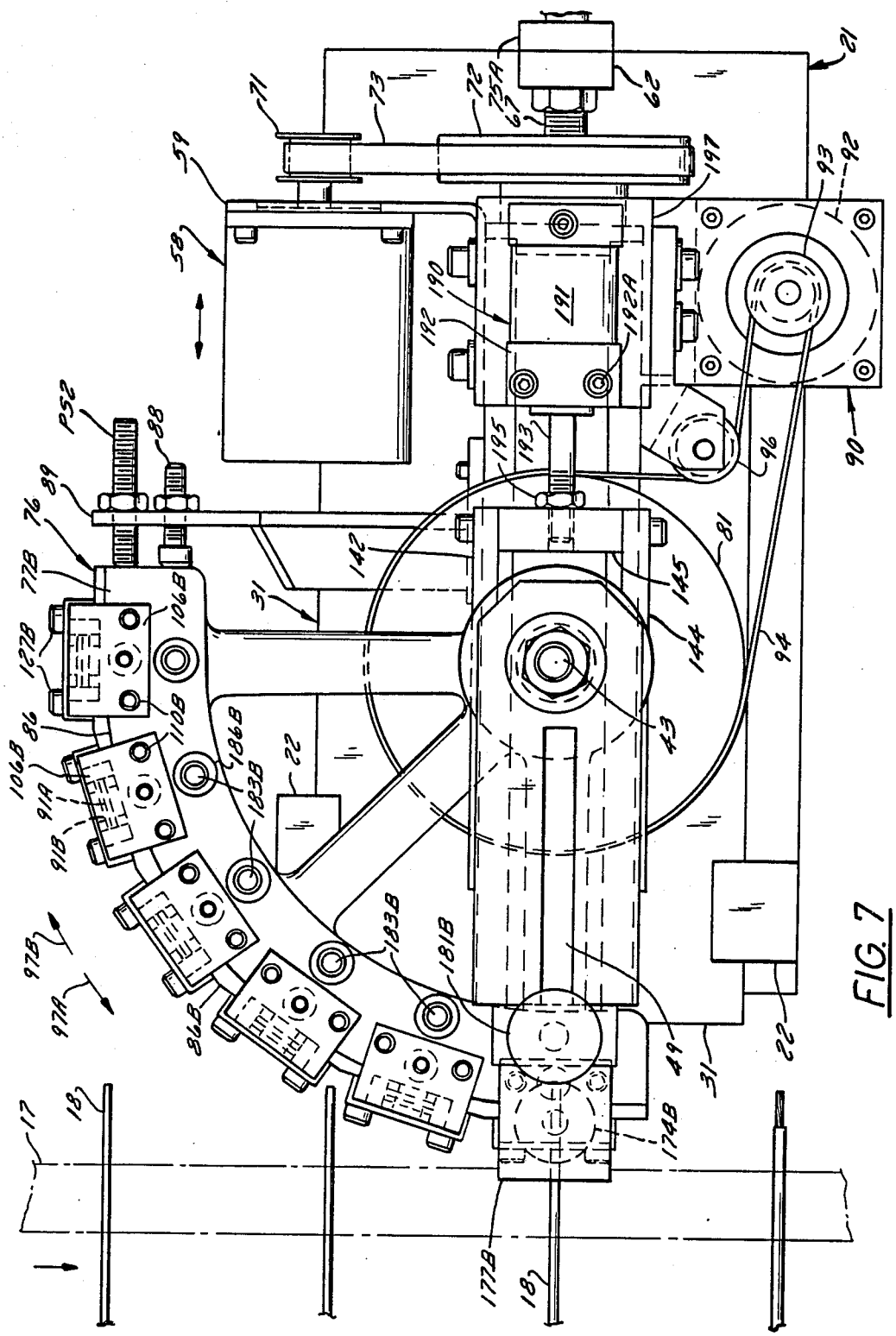
FIG. 7 is a top view of the stripper shown in FIG. 2 with the turret sector shown in one operative position.
Figure 10:
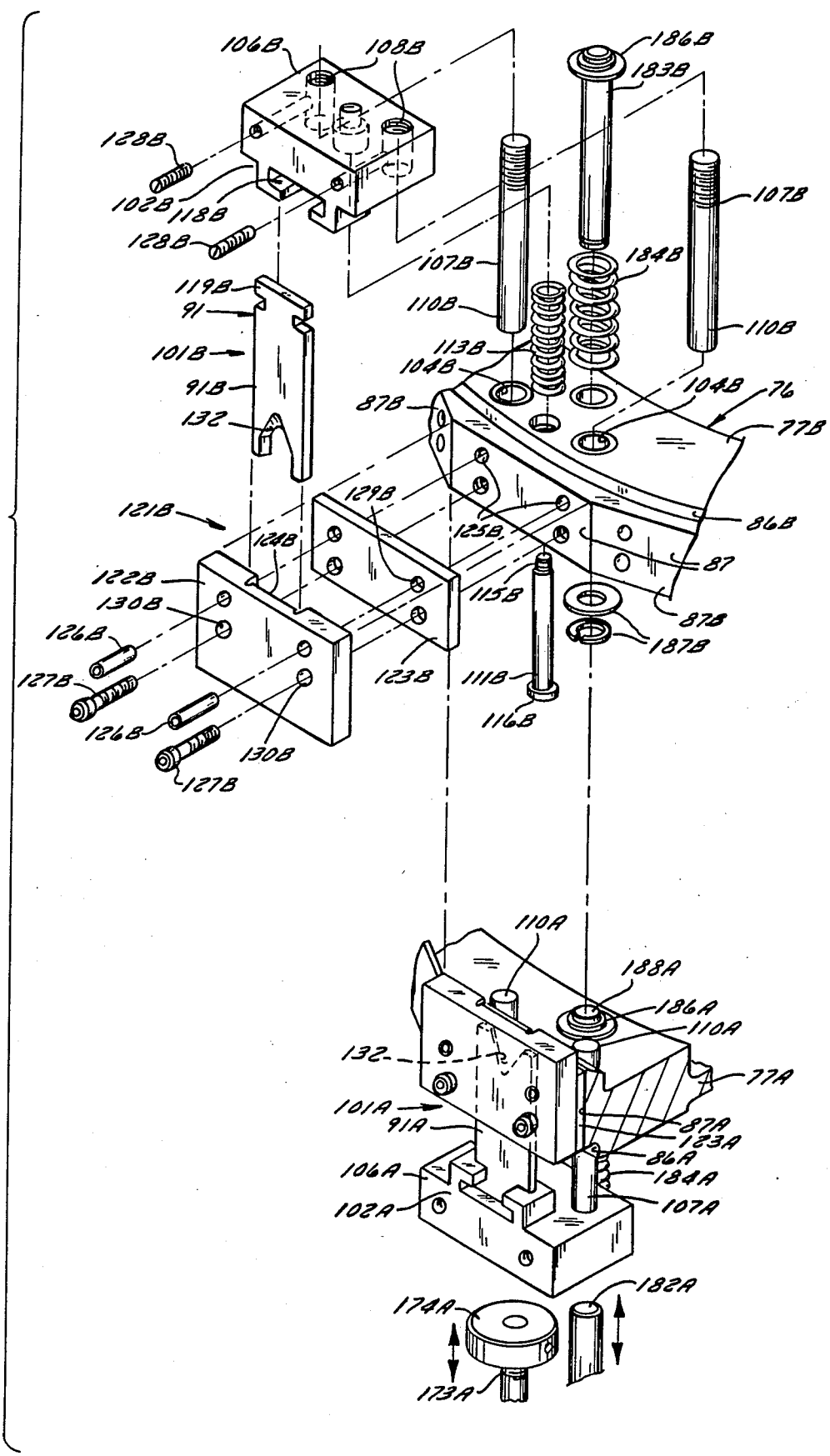
FIG. 10 is an isometric view showing the insulation cutting knives and their mounting components on the lower and upper sectors of the turret of the stripper shown in FIGS. 2, 3 and 4, with the knife and its associated mounting components shown in an assembled condition on the lower sector and the knife and its mounting components shown in exploded relation with respect to the upper sector for purposes of clarity.

The turret 76 has a radially outward facing circumferencial portion 86 best appearing in FIGS. 2, 7 and 10. The lower sector 77A has an individual radially outward facing circumferencial portion 86A and the upper sector 77B has an upper radially outward facing circumferential portion 86B. Each radially outward facing circumference portion has a plurality of individual mounting portions 87, best shown in FIG. 10. More specifically the lower sector 77A has a plurality of mounting portions 87A, only two of which are shown in FIG. 10, and similarly the upper sector 77B has a plurality of upper mounting positions 87B, three of which are shown in FIG. 10. With reference to FIG. 7, it will be noted that in the disclosed embodiment the turret has a total of six individual mounting positions, but a greater or lesser number of mounting positions could be provided depending on the number of different size cutting knives 91 used in the stripper. The lower mounting positions 87A are in vertical alignment with the upper mounting positions 87B. Therefore as the lower and upper sectors 77A and 77B are rotated in unison, the lower sector will present each of the lower mounting positions 87A below the workstation WS and will simultaneously present each of the upper mounting positions 87B in vertical alignment above the workstation. Adjustable sector stop 88 is mounted on a support arm 89 carried by carriage 31. A proximity sensor PS2 is also adjustably mounted on arm 89 and provides a reference signal to the CPU when the stripper is turned on to reference a home or base position of the turret.

The turret 76 is rotated about the axis of shaft 43 by a second drive means 90, best appearing in FIGS. 3 and 7, the second drive means includes a second step motor 92 which is secured to vertical plate 34A of the carriage 31. A cog tooth drive pulley 93 is secured to the shaft of step motor 92 and is in horizontal alignment with the cog tooth driven pulley 81 secured to sector 77A. A positive drive cog belt 94 is trained about pulleys 93 and 81. The cog belt 94 passes around an idler pulley 96. Energization of step motor 92 will move the turret 76 in counterclockwise and clockwise directions as indicated by arrows 97A, 97B in FIG. 7.

Referring to FIG. 10, an insulation cutting means 101A, 101B including a knife member 91 is mounted on the turret 76 at each of the mounting positions 87. More specifically the insulation cutting means 101A, 101B includes a lower knife 91A at each of the mounting positions 87A on the lower sector 77A and an upper knife 91B at each of the mounting positions 87B on the upper sector 77B. The insulation cutting means 101A, 101B also includes a knife mounting means 102A, 102B for mounting each of the knives 91A and 91B for reciprocal movement toward and away from the workstation.

The knife mounting means 102A, 102B will now be described and as all of the knife mounting means are identical, only the knife mounting means at one of the individual mounting positions 87 on the turret 76 in FIG. 10 will be described in detail. Each of the parts identified by the prefix word "upper" will have a counterpart on the lower sector. The knife mounting means includes an upper guide means in the form of a pair of upper apertures 104B in the upper sector 77B and an upper slide member 106B having a pair of downwardly projecting upper slide pins 107B which are slidably received in the apertures 104B, respectively. While two slide pins 107B are shown, it would be possible to mount the slide member 106B on a single pin if desired. The slide pins 107B are threaded into internally threaded apertures 108B in the upper slide member 106B. The slide pins have free ends 110B which project into the space between the sectors 77A and 77B. The members 107B may be threaded in and out relative to upper slide member 106B for adjustment purposes as will be hereinafter described. The upper slide member 106B and its associated slide pins 107B are retained in the apertures 104B by means of a retainer pin 111B which has a first portion slidably passing through an aperture 112B in the upper sector 77B and through a compression spring 113B. A second portion 115B on pin 111B is threaded into a tapped aperture 114B in slide member 106B. The retainer pin 111B has an enlarged head 116B which constitutes a first stop means for determining the open noncutting position for slide member 106B. The compression spring 113B constitutes a biasing means for biasing the side member 106B against the first stop 116B.

The knife mounting means 102B includes a means for attaching the knife member 91B to the upper slide member 106B which comprises a mortice 118B on the slide member and mating tenon 119B on the knife member. The tenon 119B is slidably engaged in the mortice 118B by movement in a direction transverse to the direction of reciprocation of the slide member relative to the sector 77B. Other types of knife attaching means could be used.

The knife mounting means 102B also includes a knife guide means 121B mounted on sector 77B at each mounting position for guiding its associated reciprocating knife member 91B. The knife guide means 121B comprises a knife guide plate 123B which is adapted to be mounted flush against the mounting position 87B on the sector 77B and a mating knife retainer plate 122B which is adapted to be mounted flush against the face of guide plate 123B. One surface of retainer plate 122B is provided with a vertically extending knife guide slot 124B dimensioned to slidably receive knife member 91B therein. A pair of spaced apart pilot pins 126B are rigidly secured in internal bores 125B provided in the sector 77B. The guide plate 123B and the retainer plate 122B are provided with pairs of apertures 129B and 130B which are in alignment with the pilot pins 126B. The guide plate 123B and the retainer plate 122B are slidably engaged on the pilot pins 126B and secured in face-to-face relation with knife member 91B in slot 124B by means of cap screws 127B threaded into internally threaded apertures 131B in upper sector 77B.

An identical knife mounting means 102A is mounted on lower sector 77A as shown in FIG. 10. The free ends 110B of the upper guide means 107B extend into the space between upper and lower segments 77A and 77B. Similarly, the free ends 110A of the lower guide pin means 107A extend into the space between the upper and lower segments 77A and 77B. The lower and upper ends 110A and 110B are in vertical alignment with each other and will contact each other during reciprocating operation to constitute a second stop means for limiting reciprocating movement on the upper and lower slide members 106B, 106A and their associated knife members 91B, 91A toward each other to a knife closed cutting position. The pins 107B can be adjusted in and out of their threaded bores 108B in slide member 106B in order to select the proper stop position. The pins 107B are locked in their set position by tightening set screws 128B.

Each of the knife members 91A has a V-shaped cutting edge profile 132 in one end thereof opposite of the tenon 119 and the apex of the cutting profile 132 is ground in a semicircular shape which is slightly larger than the diameter of the conductor in the insulated wire segment it is designed to cut. The upper and lower knife members 91B, 91A are in face-to-face slide-by relationship when they reciprocate towards each other to the knife closed insulation cutting position with the semicircular profiles 132 coacting to form a circular cutter edge which will cut through the insulation, but which will not cut or score the wire conductor. The knife profiles on each mating pair of upper and lower knives 91B, 91A at each of the mounting positions on the turret will be the same but all of the pairs will have different sizes of cutting profiles with the cutting profile 132 of each pair specifically sized to cut insulation on a wire segment having a different gauge conductor. In addition, while a single cutting profile 132 is shown on the knife member 91B in FIG. 10 it should be understood that it is possible to provide a pair of cutting profiles on each knife so as to simultaneously cut the insulation on the ends of two wire segments which are simultaneously presented at the workstation WS by the conveyor 11. By threading slide pins 107B in and out of the slide member 106B as discussed above, the degree of closing of the knife member 91 can be set with great accuracy so that an exact circular cutter profile is presented when the knives are in the closed insulation cutting positions with the upper free ends 110B in contact with lower free ends 110A. The compression spring 113B which surrounds the retainer pin 111B will always bias the slide member 106B toward the open noncutting position until the slide member 106B is moved to the closed position to transversely cut the insulation and create a cut portion of insulation at the end of the wire segment in response to actuation of a first actuating means 170 which will be described hereinafter.

A lower proximity sensor PS3 is mounted on carriage support 34 adjacent lower slide member 106A. An upper proximity sensor PS4 is mounted on carriage upper portion 49 adjacent upper slide member 106B. Proximity sensors PS3 and PS4 provide reference signals to the CPU to indicate when the knives 91A, 91B have closed and cut the insulation so that the gripping means 141, which will now be described, can be energized to strip the cut insulation portion from the wire segment 18.

Figure 5:
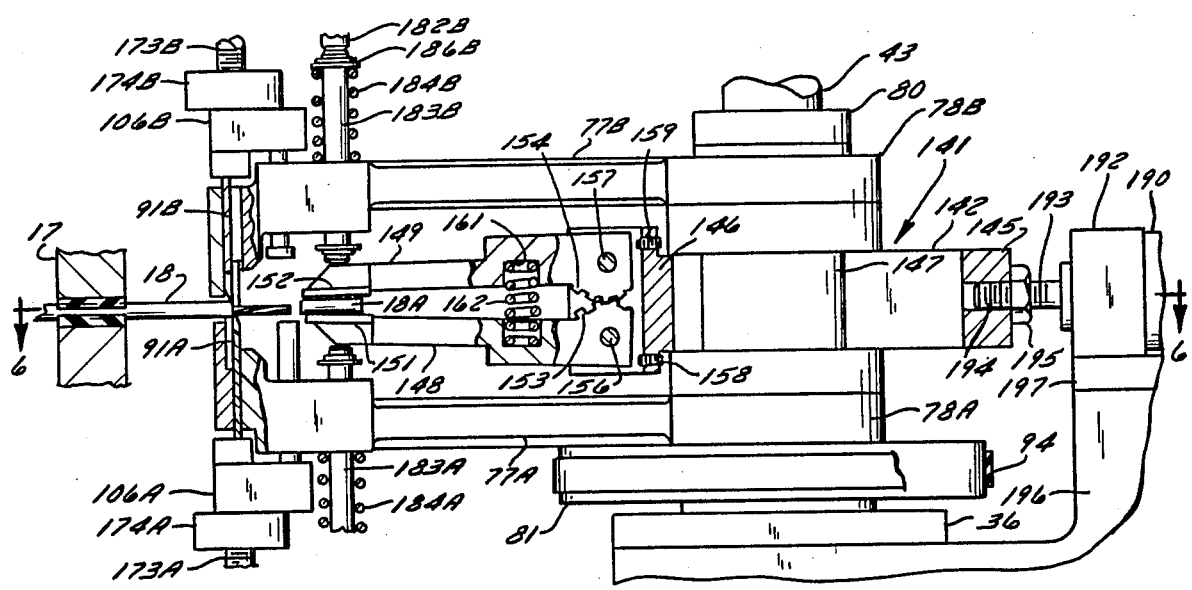
FIG. 5 is a partial side elevational view of the stripper shown in FIGS. 3 and 4, partially in section, with the gripping and guiding means shown in the position assumed after a cut portion of insulation has been removed from the end of the wire segment.
Figure 6:
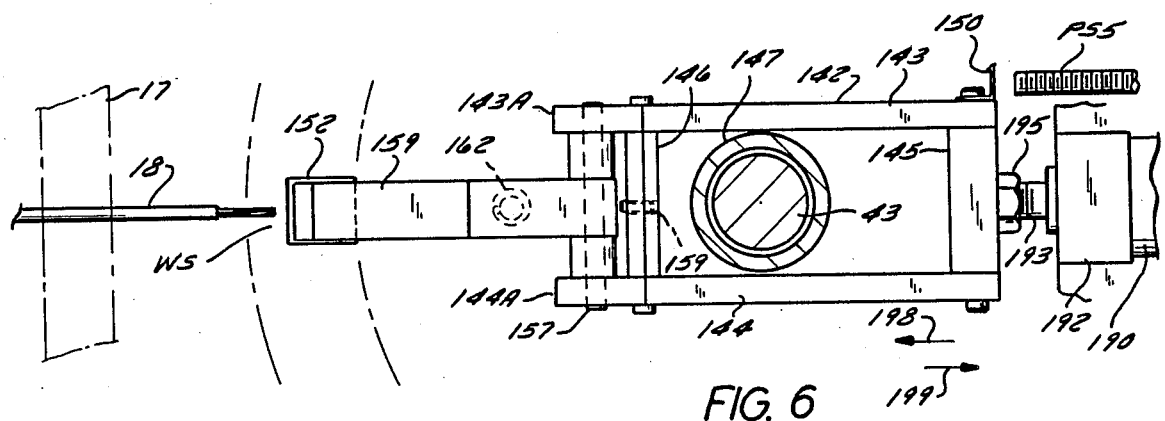
FIG. 6 is a partial sectional view taken along lines 6—6 of FIG. 5.

A gripping and guiding means identified by the reference character 141, best shown in FIGS. 5 and 6, is mounted on the carriage 31 and is movable between an open position shown in FIG. 3 and a closed position shown in FIG. 4 for gripping the portion of insulation 18A at the end of the wire segment 18 and guiding it as it is stripped off of the conductor. The gripping and guiding means 141 comprises a slide frame 142 and lower and upper gripper arms 148, 149. The slide frame 142 surrounds a guide bushing 147 on shaft 43 and includes side frame members 143 and 144 and end members 145 and 146. The slide frame 142 reciprocates in the directions indicated by arrows 198, 199 in FIGS. 6 and 11 relative to the workstation WS. The side member 143 has a projecting portion 143A and side member 144 has a projecting portion 144A. The lower and upper gripper arms 148, 149 are secured between the projecting portions 143A and 144A by a lower and upper pivot shafts 156, 157. The lower arm 148 includes a lower gear section 153 which is in mesh with an upper gear sector 154 carried by the upper arm 149. The intermeshed gear sectors 153 and 154 will cause the lower and upper arms 148, 149 to move toward and away from each other in unison. Lower and upper set screws 158 and 159 are provided in end member 146 to provide adjustable stops for determining the open position of lower and upper arms 148, 149. Each of the arms 148, 149 is provided with a recess 161 and a compression spring 162 is mounted in the recesses 161 to bias the lower and upper arms apart to the normally open position as determined by the adjustable settings of the set screws 158 and 159. The lower arm terminates in a lower gripping jaw 151 and the upper arm 149 terminates in an upper gripping jaw 152. Jaws are serrated so as to grip insulation portion 18A when the gripping and guiding means 141 is moved to the closed position. The gripping and guiding means is movable to a closed position by a second actuating means 180 which will be subsequently described. A third actuating means 190 is also provided for effecting movement of the gripping means 141 toward and away from the workstation WS in the direction of arrows 198 and 199, respectively, in FIG. 6. A proximity sensor PS5 (FIG. 6) is mounted on carriage 31 and coacts with a trip dog 150 on frame member 143. Sensor PS5 is connected to provide a reference signal to the CPU identifying the home position of the gripping means as will be further described hereinafter.

The first, second and third actuating means, best shown in FIGS. 2, 3 and 4, are generally identified by the reference characters 170, 180 and 190, respectively, and will now be described.

The first actuating means 170 includes lower and upper transducers 171A and 171B mounted on lower and upper portions 37 and 49, respectively, of the carriage 31. With specific reference to FIG. 4, the lower portion 37 of the carriage is provided with a lower support element 164A having a bore 165A therethrough. Similarly the upper portion 49 is provided with an upper support element 164B which has a bore 165B therethrough. A pair of lower spaced apart support blocks 176A and 177A are secured to the lower support element by cap screws 178C (FIG. 3) and support the lower transducer 171A. A pair of upper spaced apart support blocks 176B and 177B are secured to the upper support element 164 by cap screws 178C and support the upper transducer 171B. The upper and lower transducers 171A and 171B include knife push rods 172A and 172B, respectively, which project towards workstation WS. The ends 173A, 173B of knife push rods 172A and 172B are threaded and push pads 174A and 174B are threaded thereon. The push pads 174A and 174B are in face-to-face engagement with slide members 106A and 106B on which cutter knife members 91A and 91B are mounted. Energization of transducers 171A and 171B will cause the knife push rods 172A, 172B to move in the direction of arrows 179A and 179B to move the cutting knives 91A, 91B to a closed insulation cutting position and to move the push rods 172A and 172B in the direction of arrows 178A and 178B to move the knives 91A and 91B to an open noncutting position assisted by springs 113A, 113B.

The lower and upper support elements 164A and 164B also support the second actuating means 180 which includes lower and upper transducers 181A and 181B. The lower and upper bores 165A and 165B are provided with enlarged internally threaded portions 166A and 166B. The upper and lower transducers 181A and 181B have similarly enlarged externally threaded portions 168A and 168B which are threaded into portions 166A and 166B. The upper and lower transducers 181A and 181B also include gripper push rods 182A and 182B which are slidably mounted in lower and upper bushings 167A and 167B for reciprocating movement therein. The lower griper push rod 182A is in contact with a lower gripper plunger 183A which is slidably mounted in lower sector 77A and upper gripper plunger 183B is similarly mounted in upper sector 77B. Compression springs 184A and 184B surround the lower and upper gripper plungers, respectively, are secured in place by keeper means 186A, 187A, 186B and 187B. The innermost end 188A of lower gripper plunger 183A is in contact with lower gripper arm 148. The innermost end of upper gripper plunger 183B is in contact with upper gripper arm 149.

Energization of the lower and upper transducers 181A and 181B will cause the lower and upper gripper plungers 183A and 183B to move in the direction of arrows 179A and 179B to close the gripper means 141, and in the direction of arrows 178A and 178B to open the gripping and guiding means 141.

The third actuating means 190 (FIGS. 3, 4 and 7) is mounted on a cross plate 197 carried by upper portion 196 of side plates 34A and 34B. The third actuating means 190 includes a transducer 191 which is mounted in a support block 192 secured to the cross plate 197 by means of cap screws 192A (FIG. 7). The transducer 191 includes a gripper slide rod 193, which has a threaded portion 194 on a free end thereof. The threaded portion 194 is threaded into an internal bore provided in end member 145 and secured therein by lock nut 195. As previously discussed, the gripping and guiding means 141 is normally biased to an open position by compression spring 162. Energization of transducer 191 will move the gripping means toward the workstation WS in the direction of arrow 198 when the gripping and guiding means 141 is in an open position and away from the workstation WS in the direction of arrow 199 when the gripping means 141 is in a closed position.

The transducers 171A, 171B, 181A, 181B and 191 could be single or double acting pneumatic or hydraulic cyclinders, or could be electrically actuated solenoids.

Operation of First Embodiment

The operation of the first embodiment will now be explained with reference to FIGS. 11 and 12. The apparatus for cutting and conveying insulated wire segments having conductors of the same or differing gauges to a workstation WS for removing variable length insulation portions by means of a wire stripper 12 is under direction of the programmable CPU. The following description presupposes that a wiring harness comprising a plurality of wire segments 18 of several different conductor gauges needing differing stripped lengths of bare conductors is required. The sequence which the wire selector/feed mechanism 10 will follow in presenting different gauges of wire to the conveyor 11 is programmed into the CPU as is the strip length of bare conductor for each of the wire segments of the harness. In addition, the type of terminal to be attached to the stripped end by the terminal attachment machine 19 is also programmed into the CPU. If the insulation portion on any given wire segment is to be cut but not removed, this instruction is also programmed into the CPU. If desired, the CPU can also be programmed to instruct the terminal attachment machine to not apply a terminal to any given wire segment. The conveyor 11 will receive the cut wire segments 18 in the programmed sequence and will carry each wire segment to the workstation WS of the programmable stripper 12 which is functionally illustrated in FIG. 11. One complete stripping cycle is illustrated in FIG. 12. When the stripper is turned on, sensor PS2 will signal the CPU unit that the turrent 76 is in the home position shown in FIG. 7 and PS1 will signal the CPU unit that the carriage 31 is in the home position. The cycle begins as the wire segment is presented at the workstation WS shown in FIG. 11. As a wire segment is presented at the workstation, CPU energizes step motor 91 to move turret 76 to select the proper set of knives for stripping the gauge of the wire segment currently at the workstation WS. As shown in FIG. 12, this turret position is then held through the entire cycle. In the first embodiment there are six different sets of knives carried by the turret so six different gauges of wiring segments could be used in the wiring harness.

At the same time the position of turret 76 is being selected, step motor 58 is also being energized to move the carriage 31 in the direction of arrow 74A or 74B to move the cutter knives 91 toward or away from the workstation WS to the position required by the length of insulation 184 which is to be cut and stripped from the end of the wire segment. This carriage position is also held through one entire cycle as shown in FIG. 12.

Immediately after the turret and carriage positions have been selected, the CPU will energize the second actuating means transducers 181A and 181B to move the gripping and guiding means 141 in the direction of arrows 179A and 179B to a closed position with jaws 151, 152 gripping the end 18A of the wire segment 18. As shown in FIG. 12, this closed position of the gripping means 141 is held for only part of the remaining cycle. Immediately after the gripping means have moved to the closed position, the CPU will energize the first actuating means transducers 171A and 171B to move the cutter knives 91A, 91B in the direction of arrows 179A and 179B to a closed insulation cutting position. After the knives 91A, 91B have cut, the insulation PS3 and PS4 will signal the CPU which will energize the third actuating means transducer 191 to move in the direction of arrow 199 to axially withdraw the insulation slug from the end of the wire segment. The knives 91A, 91B remain closed around the conductor and abut the end of the retained portion of insulation on wire segment 18 to prevent it from being stretched as the gripping and guiding means 141 slides and guides the insulation slug 18A axially off of the conductor in the wire segment. If the insulation slug 18A is not to be removed, the CPU will not energize the third actuating means 191. After the insulation slug 18A has been axially withdrawn off the end of the conductor of the wire segment, the CPU proximity sensor PS5 will signal the CPU that the gripping and guiding means is in the home position indicating that the insulation slug has been withdrawn and the CPU will (1) again energize the second actuating means transducers 181A and 181B to open the stripping means 141 so that the insulation slug 18A can eject from between the jaws 151, 152; and, (2) simultaneously energize the first actuating means transducers 171A and 171B to move the cutter knives 91 in the direction of arrows 178A and 178B to move the knives to their open noncutting position. After both the gripping and guiding means and the cutter knives have been returned to their open positions, the CPU will energize the third actuating means 191 to move the gripping and guiding means in the direction of arrow 198 back toward the workstation to place the gripping and guiding means in a reset position ready for the next cycle.

After the end of the wire segment has been stripped to the appropriate length, the conveyors 16 and 17 carry the stripped wire segment to the terminal attaching machines 19 where the CPU directs the attachment of the proper terminal end or directs that no terminal be applied.

The apparatus would function in the same manner as above described if batches of wire segments, with each batch having conductors all of the same gauge, were being processed. In this situation the turret 76 will be initially moved to place the proper knives 91A, 91B at the workstation WS and then will not be moved until a subsequent batch of wire segments of a different gauge is presented at the workstation. Similarly, if the stripped portion is to be of the same length for all wire segments of a given batch, the carriage 31 will be initially adjusted and then not moved until all wire segments of a batch are stripped.

Second Embodiment

Figure 13:
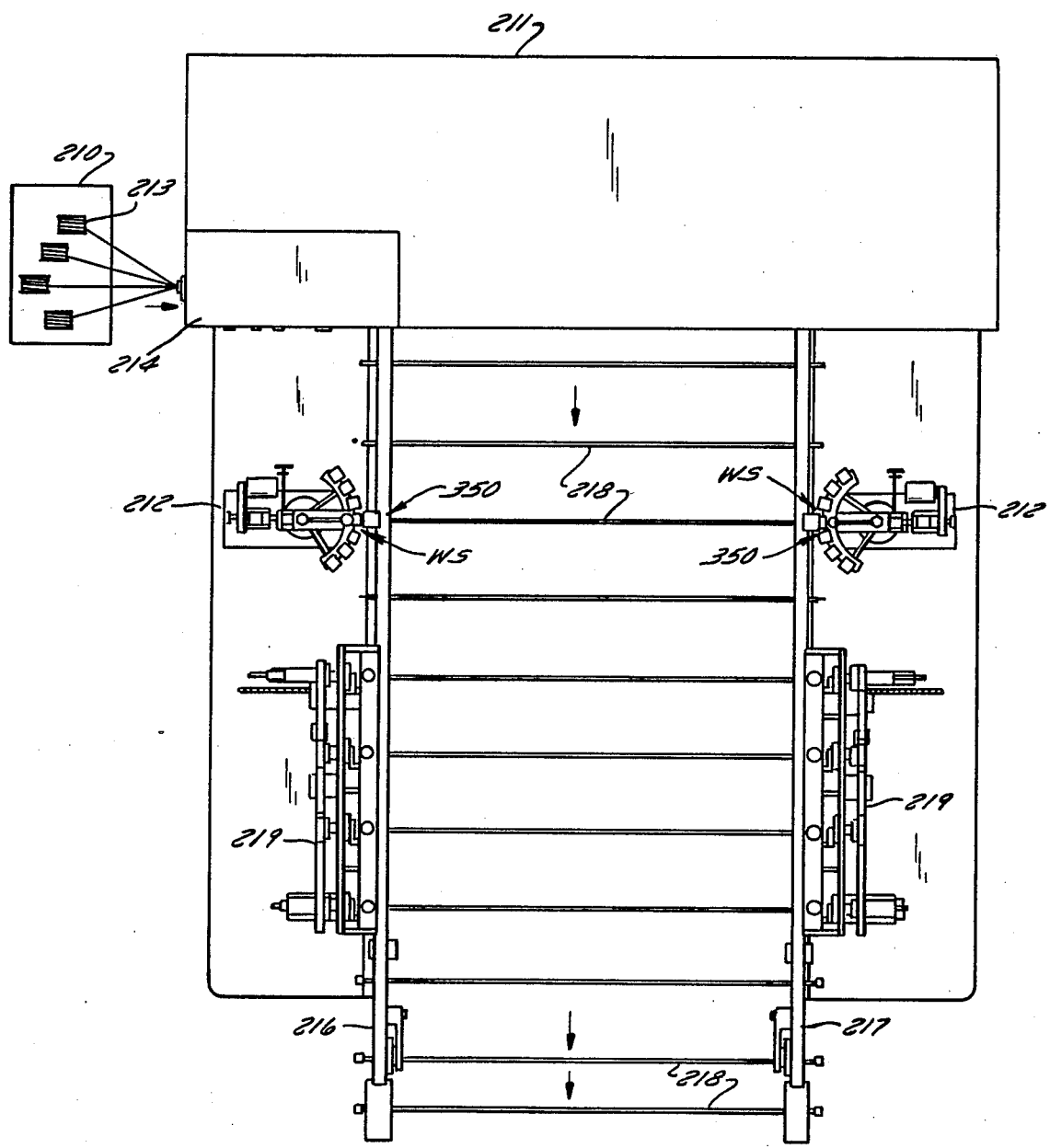
FIG. 13 is a plan view of an apparatus having a wire feeding and cutting means, a conveying means for conveying cut wire segments, a second embodiment of a stripper for removing variable length insulation portions from the ends of the wire segments and a terminal applying machine.

The second embodiment of the apparatus is shown in FIGS. 13 through 29. Referring to FIG. 13, the apparatus includes a wire selector feed mechanism 210, a wire insertion mechanism 214, a conveyor mechanism 216, 217, the second embodiment of the programmable stripper 212 and a terminal applying machine 219. These mechanisms are arranged as shown in FIG. 13 and operated in a prearranged sequence under the direction of a central processing unit (hereinafter termed CPU) shown in FIG. 29, as will be described in more detail hereinafter.

Figure 15:
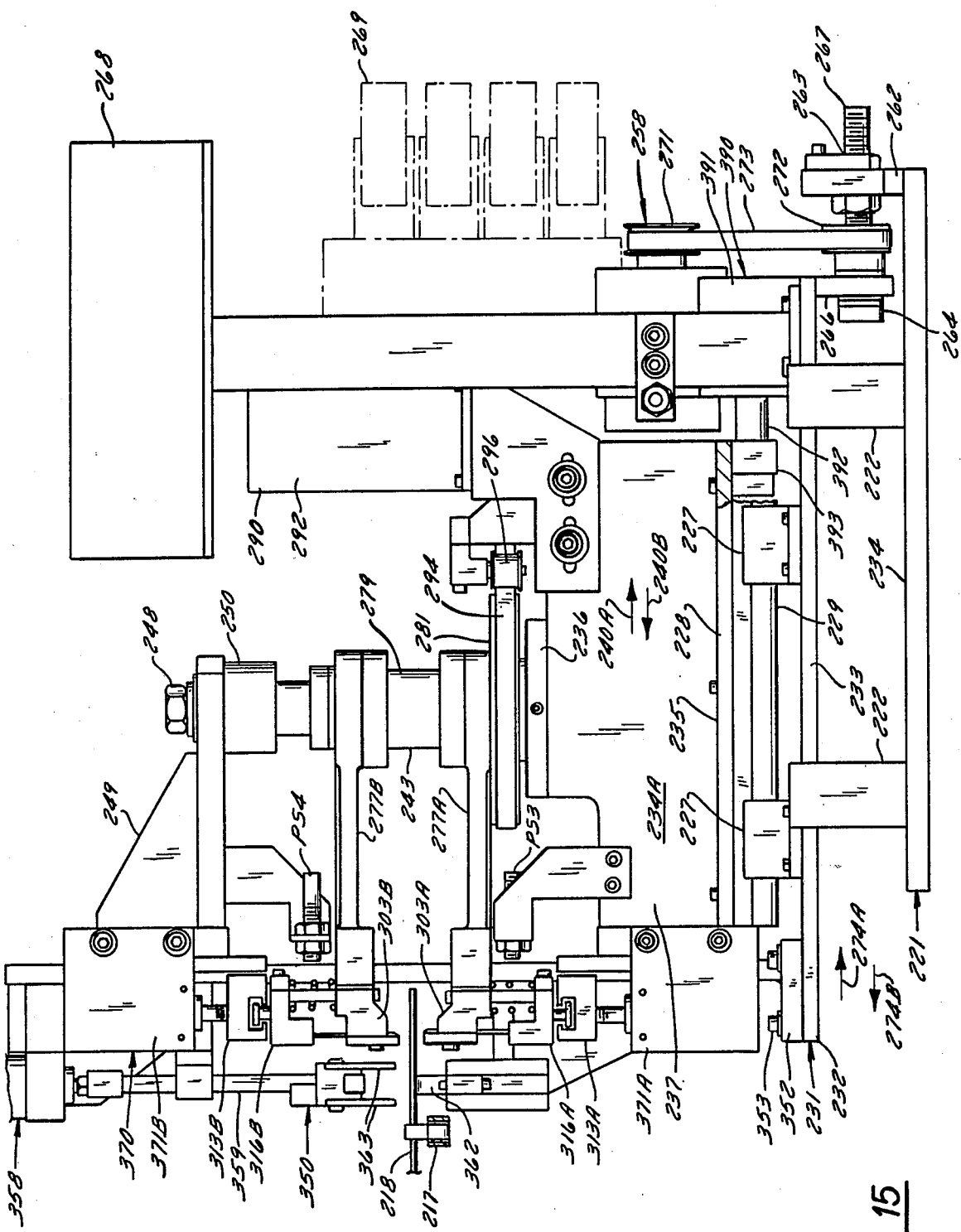
FIG. 15 is a side elevational view of the stripper in FIG. 14 with the clamping means, knife means and gripping and guiding means in an open position.
Figure 18:
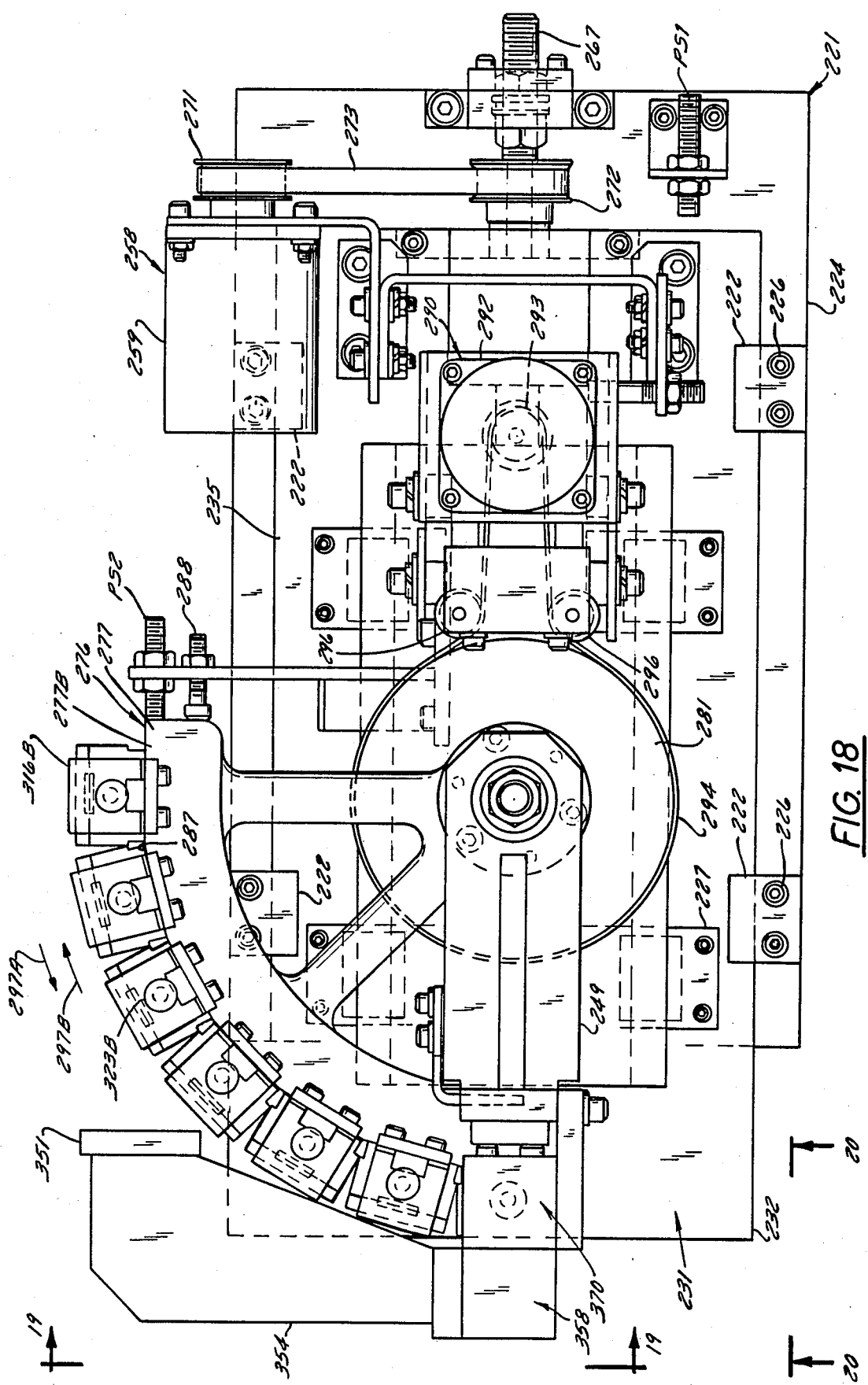
FIG. 18 is an enlarged top view of the stripper with the turret sector shown in one operative position.
Figure 22:
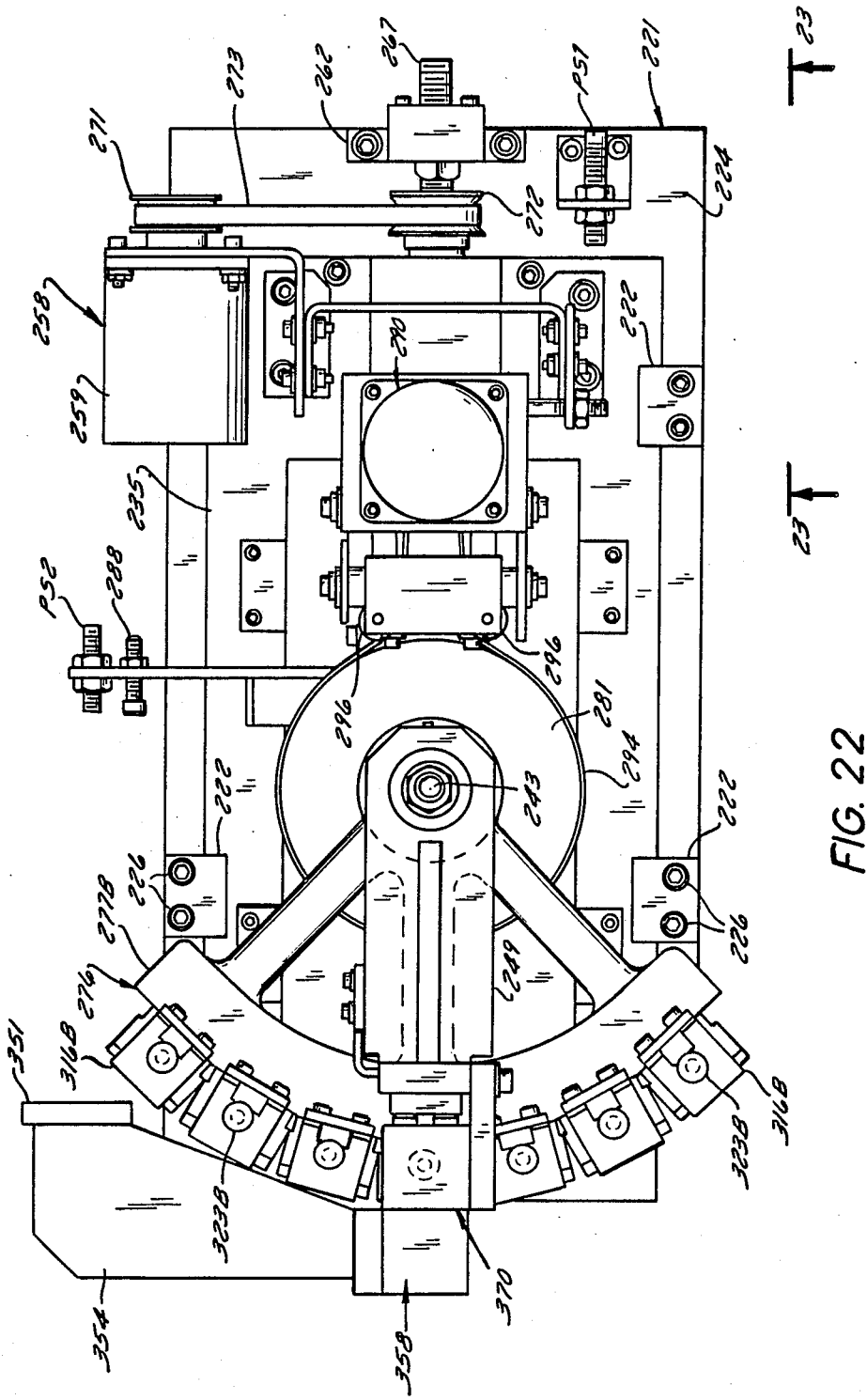
FIG. 22 is a top view of the stripper with the turret sector shown in another operative position.
Figure 23:
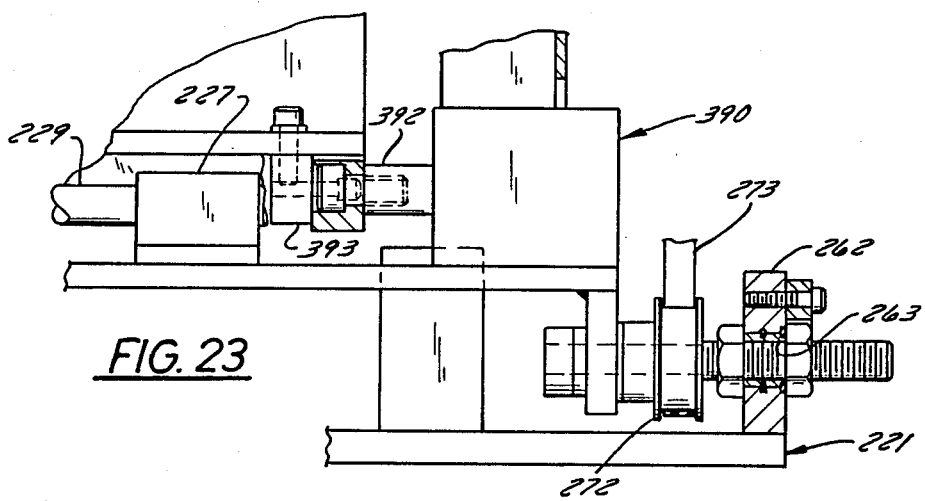
FIG. 23 is a partial side elevational view taken along line 23—23 of FIG. 22.
Figure 24:
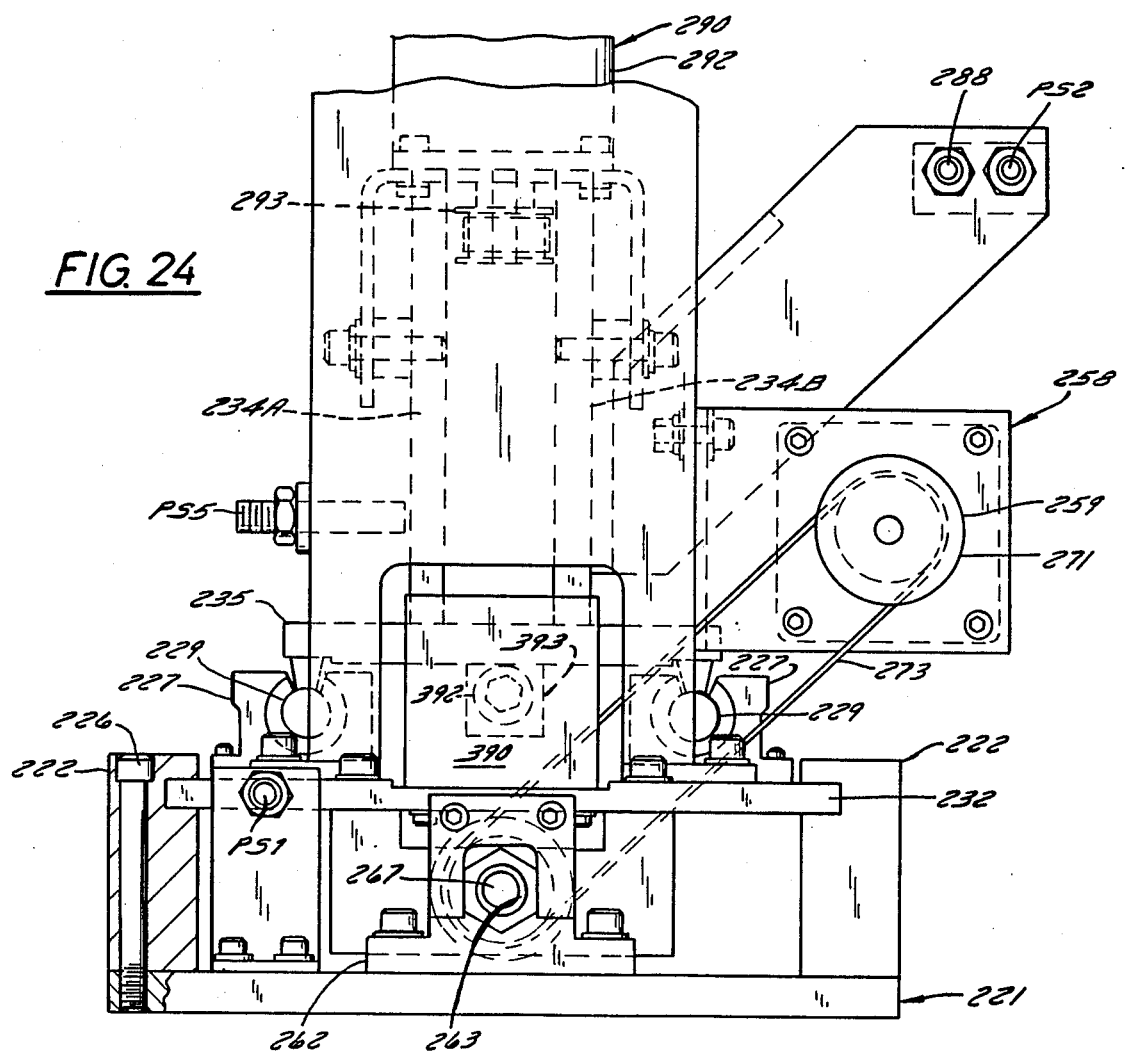
FIG. 24 is a partial rear elevational view of the stripper shown in FIG. 22.

The components of the apparatus as shown in FIG. 13 operate in exactly the same manner as the corresponding components shown in FIG. 1 and therefore a detailed description will not be made. In the second embodiment, the programmable stripper includes a wire gathering unit which is identified by reference character 350 in FIG. 13. Referring particularly to FIGS. 14, 15 and 18, the programmable stripper 212 of the second embodiment comprises a base frame 221 which is adapted to be secured at a fixed position adjacent to the path of travel of one of the conveying units 216 and 217. The base frame 221 includes a fixed base plate 224 and a plurality of spaced apart block members 222 having horizontal guideways 223 therein. Preferably four block members 222 are provided and are secured on the base plate 224 with their guideways 223 facing each other. The block members are removably secured to the base plate 224 by machine bolts 226. The guideways provide a means for mounting a carriage 231 on the base frame 221 for movement toward and away from a workstation WS.

The carriage in the second embodiment includes a first subframe 232 and a second subframe 235. The first subframe 232 includes a first side plate 233 which is slidably mounted in the block members 222 for reciprocal movement in the direction of arrows 274A and 274B in horizontal plane P1 in order to adjust for strip length as will be more fully described hereinafter. A first drive means 258 is mounted on the first side plate 232 and includes a step motor 259. The step motor 259 has a cog tooth power output pulley 271 mounted thereon. The stationary base plate 224 includes an upstanding bracket 262 having an internally threaded bore 263 with a threaded shaft 267 mounted therein. A driven cog tooth pulley 272 is fixedly mounted on the threaded shaft 267. A hub 264 fixed on shaft 267 is rotatably mounted in a downwardly extending bracket 266 carried by the first subframe 232. A cog belt 273 connects the driving and driven pulleys 271, 272. Energization of the step motor 259 will rotate driven pulley 272 clockwise or counterclockwise to move the first subframe 232 back and forth relative to the workstation WS in order to adjust the stripper for the length of insulation to be stripped from the wire segment. An enclosure 268 for housing the CPU unit and control valves 269 (shown in dot-dash lines in FIG. 15) for first, second and third actuating means 370, 380 and 390 are also mounted on the first slide plate. The first subframe 232 also includes a plurality of laterally spaced guides 227 each having a bearing means therein for reciprocally mounting the second subframe 235 as will now be described.

The second subframe 235 of the carriage includes a second slide plate 228 mounted in a horizontal plane P1' which is in spaced parallel relation to plane P1. A pair of transversely spaced apart parallely extending rails 229 are mounted to depend from the bottom of the second slide plate 228. Preferably the rails 229 are annular in cross section and mounted in the bearing means of each of the guides to permit reciprocating movement of the second subframe toward and away from the workstation WS. The reciprocating movement of the second slide plate 228 will perform the stripping action as will be more fully described hereinafter. A third actuating means 390 in the form of transducer 391 is mounted on the first slide plate. The transducer 391 has a piston rod 392 connected to the second slide plate 228 by means of mounting bracket 393. Energization of the third actuating means transducer 391 will cause the second slide plate 228 to move toward and away from the workstation WS. A proximity sensor PS1, FIG. 18, is mounted on the fixed base plate 224 in a position to sense the home position of the first slide plate 233 relative to the work station WS. A proximity sensor PS5 senses a home position of subframe 235.

The carriage 231 also includes a main support structure which comprises a pair of spaced parallel vertically extending plates 234A and 234B which are rigidly secured to the second slide plate 228 to constitute the lower portion 237 of the carriage. A cross member 236 interconnects the upper freestanding ends of the main support plates 234A and 234B. The lower portion of the carriage extends generally transversely away from the conveyors 218, 219. The carriage 231 further includes an upper portion 49 which will now be described.

Figure 26:
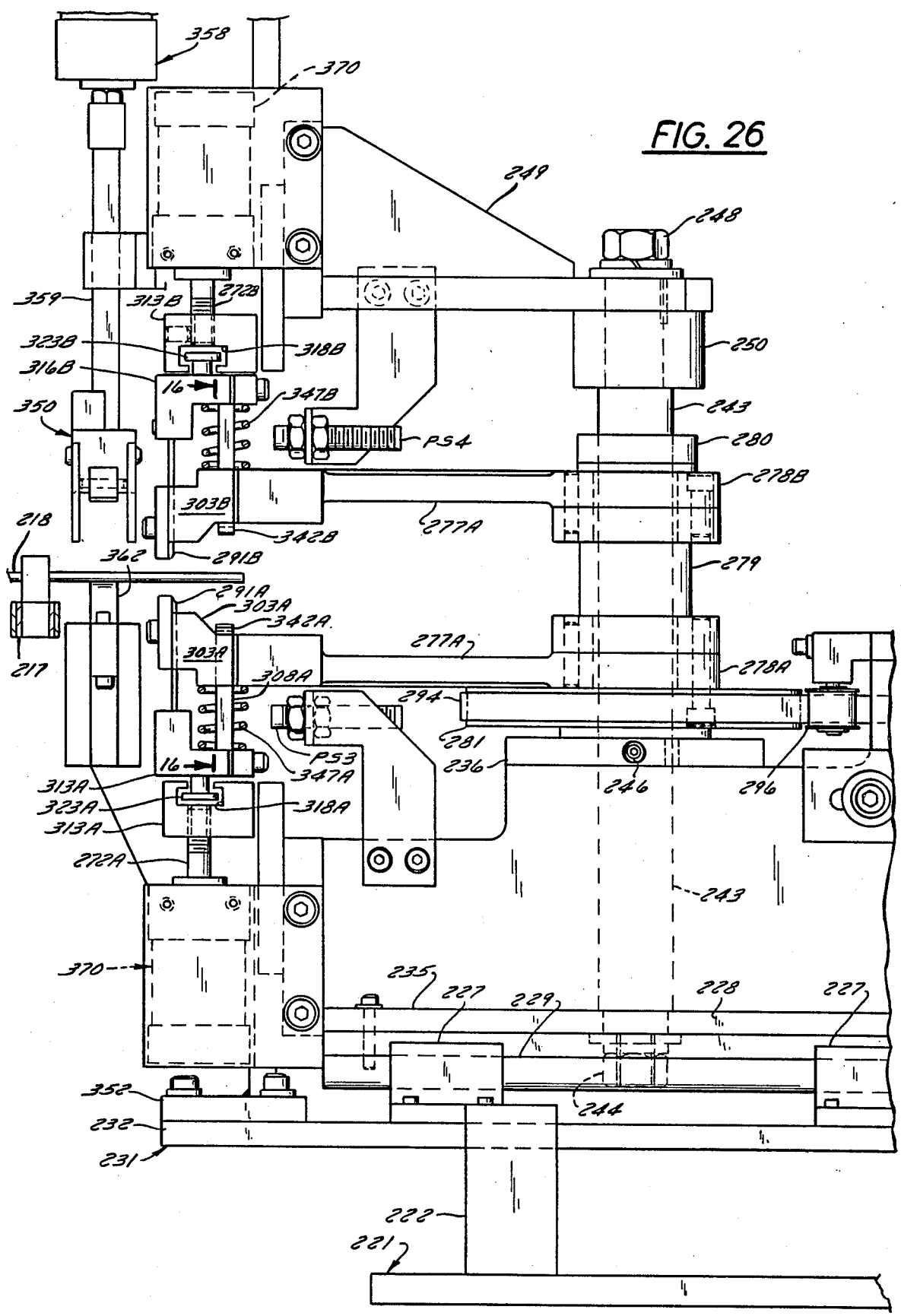
FIG. 26 is a partial side elevational view of the stripper showing the clamping means, knives and gripping and guiding means in an open position.
Figure 27:
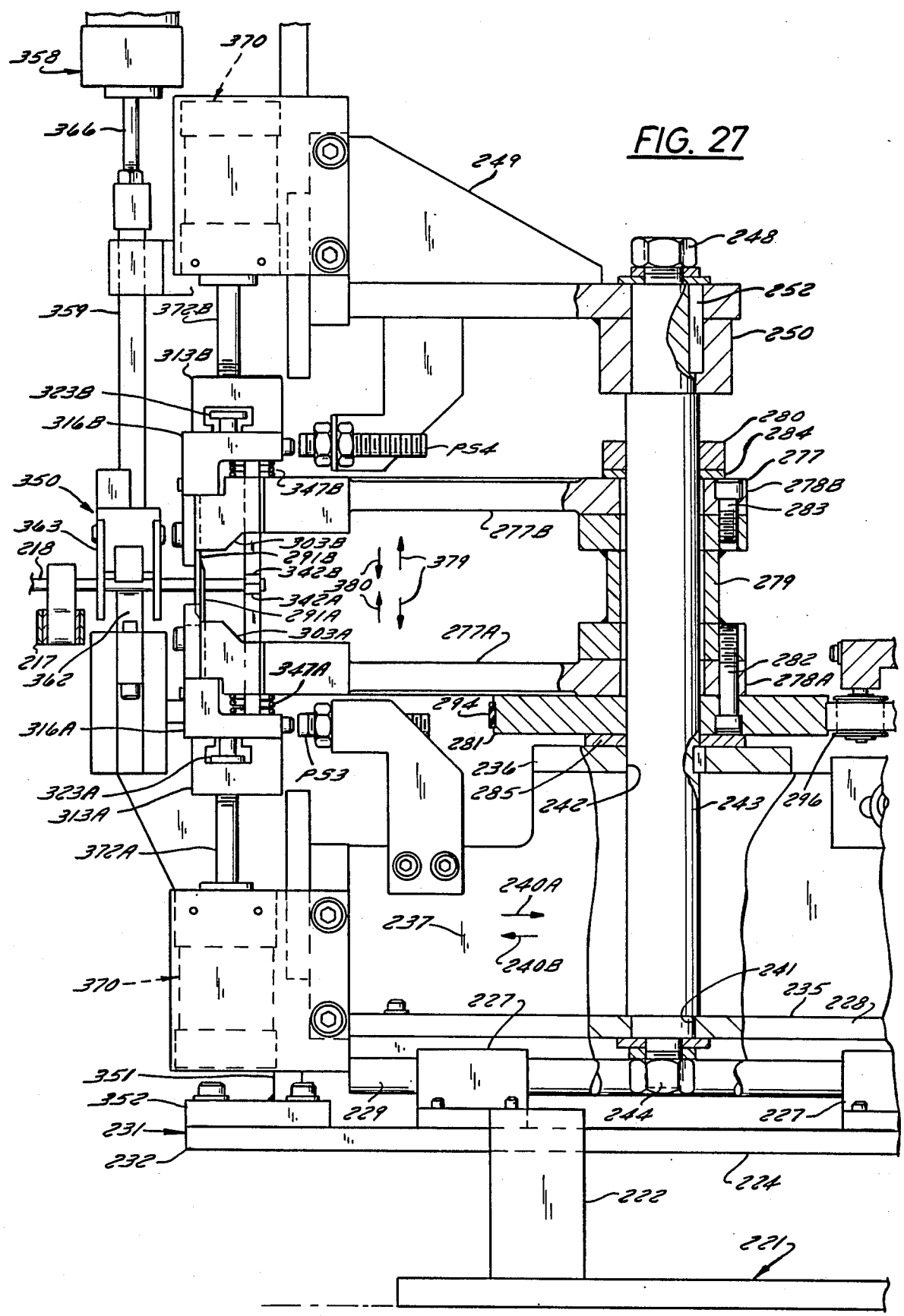
FIG. 27 is a partial side elevational view of the stripper, with some parts in section, showing the clamping means, knives and gripping and guiding means in a closed position.

Referring to FIG. 27, the second slide plate 228 and the cross member 236 are provided with vertically aligned apertures 241 and 242. A shaft 243 is fixedly mounted in apertures 241, 242 to extend in an angular relation relative to the carriage. Preferably the shaft 243 will extend at right angles to the first plane P1' in which the carriage second side plate 228 lies. The lower end of the shaft 243 is externally threaded and rigidly secured in aperture 241 by means of a nut 244. A midporton of the shaft which passes through the cross member is secured by means of a set screw 246 (FIG. 26). The upper end of the shaft 243 is also externally threaded. The upper portion 249 comprises a cantilever having a hub 250 which is apertured to receive shaft 243 therethrough. The cantilever 249 extends in spaced parallel relation to the lower portion 237 and in the same direction as the lower portion towards the workstation WS. The upper portion 249 is rigidly mounted in a fixed position on the upper end of the shaft 243 by means of a nut 248 and key 252.

A turret 276 (FIGS. 15, 18, 22 and 27) is mounted on the second subframe 235 of carriage 231 between the upper and lower portions 237 and 249 for movement relative thereto. Turret 276 comprises a sector 77 which has an included arc of 90°. Sector 277 comprises lower and upper sectors 277A, 277B which lie in spaced apart second and third planes P2, P3 (FIG. 14) which are in spaced parallel relation to each other and to the first plane P1' in which the carriage second side plate 228 moves. As best appears in FIG. 27, the lower sector 277A includes a boss 278A having an aperture sized to slidably fit on shaft 243. The upper sector 277B also has a similar boss 278B sized to slidably fit on shaft 243. The bosses are mounted on shaft 243 and maintained in spaced relation to each other by a spacer sleeve 279. The spacer sleeve 279 is fixedly secured to the lower and upper bosses 278A, 278B by cap screws 282, 283 to maintain the lower and upper sectors in alignment with each other. A cog tooth drive pulley 281 for rotating the sector 277 is also rotatably mounted on shaft 243 below boss 278A and above a thrust washer 285 riding on the cross member 238. A driven pulley 281 is nonrotatably secured to boss 278A and the sleeve 279 by the cap screw 282. As the sectors 277A and 277B are both secured in fixed relation to the sleeve 279 and driven pulley 281, the sectors will pivot in unison about an axis provided by shaft 243. The sector assembly which has just been described is maintained in vertically fixed position relative to the shaft 243 by means of a retainer ring 280 secured to the upper portion of shaft 243. The retainer ring 280 abuts the upper surface of boss 278B. The lower surface of boss 278B rides on a thrust washer 284 carried by the cross member 236.

Figure 25:
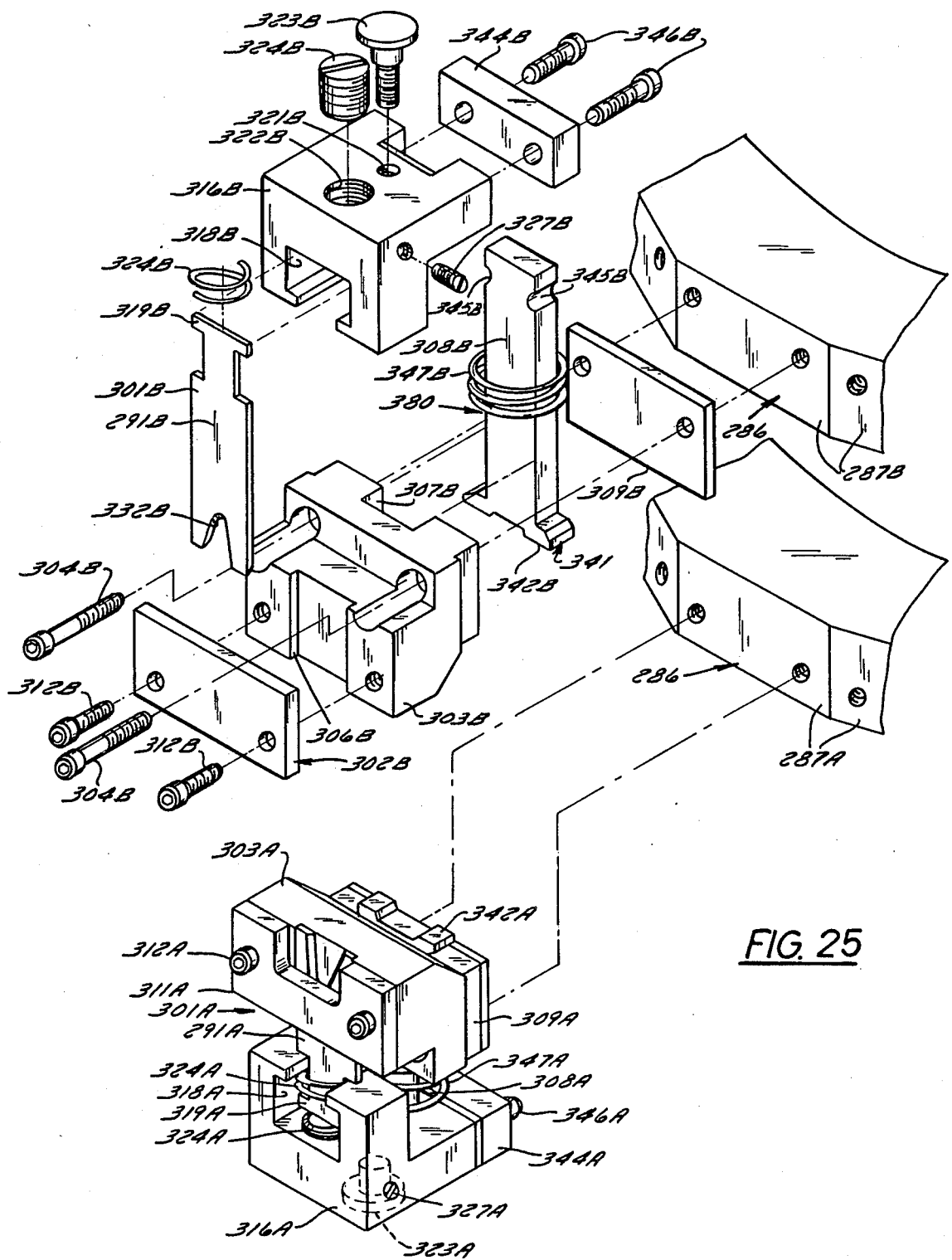
FIG. 25 is an isometric view showing the insulation cutting knives, gripping and guiding means and mounting components on the lower and upper sectors of the turret of the stripper with the lower knife and its associated mounting components shown in an assembled condition ready for mounting on the lower sector and an upper knife and its mounting components shown in exploded relation with respect to the upper sector for purposes of clarity.

The turret 276 has a radially outward facing circumferential portion 286A, 286B best appearing in FIGS. 18 and 25. More specifically, the lower sector 277A has an individual radially outwardly facing circumferential portion 286A and and the upper sector 277B has an upper radially outward facing circumferential portion 286B. Each of the radially outward facing circumferential portions has a plurality of individual mounting positions 287A, 287B. Three of the lower mounting positions 287A of the lower sector and three of the mounting positions 287B of the upper sector are shown in FIG. 25 with the upper and lower mounting positions being in vertical alignment with each other. With reference to FIG. 18, it will be noted that in the stripper of the second embodiment the turret has a total of seven individual mounting positions 287. As the lower and upper sectors are rotated in unison, the lower sector will present each of the lower mounting positions 287A below the workstation WS and the upper sector will simultaneously present each of the upper mounting positions 287B in vertical alignment with the lower mounting positions above the workstation WS. An adjustable sector stop 288 is mounted on a support arm 289 carried by the carriage second subframe 235 as shown in FIG. 18. A proximity sensor PS2 is also mounted on arm 89 and provides a reference signal to the CPU when the stripper is turned on to reference the home or base position of the turret 276 which is shown in FIG. 18.

The turret 276 is rotated about the axis of shaft 243 by a second drive means 290 best shown in FIGS. 15 and 18. The second drive means 290 includes a second step motor 292 which is secured to and above the vertical plates 234A and 234B of the carriage 231. A cog tooth drive pulley 293 is secured to the output shaft of step motor 292 which is in horizontal alignment with the cog tooth driven pulley 281 secured to sector 277A. A positive drive cog belt 294 is trained about the pulleys 293 and 281. Tension to keep the belt engaged is provided by a pair of idler pulleys 296. Energization of the step motor 292 by the CPU will move the turret 277 in counterclockwise and clockwise direction as indicated by arrows 297A and 297B in FIG. 18 to place any desired mounting position at the workstation WS.

The insulating cutting means 301A and 301B, best shown in FIGS. 14, 25 and 26, will now be described. The insulation cutting means includes a lower knife 291A at each of the lower mounting positions 287A on the lower sector 277A and an upper knife 291B at each of the mounting positions 287B at the upper sector 277B. The insulation cutting means also includes a knife mounting means 302A, 302B for mounting each of the knives for reciprocal movement toward and away from the wire segment being held at the workstation WS.

As the lower and upper knife mounting means 302A, 302B are identical, only the upper exploded knife mounting means 302B at individual mounting position 287B on the turret as shown in FIG. 25 will be described in detail. Each of the part numbers identified by the suffix "B" on the upper mounting means will have a counterpart on the lower sector identified by the same number but which includes the suffix "A". The knife mounting means 302B includes a retainer block 303B which is adapted to be rigidly secured on the mounting position 287B by means of a pair of cap screws 304B. The retainer block 303B includes a first guide means in the form of knife guiding slot 306B and a second guide means in the form of a slot 307B for receiving the connecting rod 308B. The connecting rod 308B, which is part of a second actuating means 380 that will be described more fully hereinafter, is slidably received in the second guide means 307B and is held therein by a guide plate 309B which is interposed between the retainer block 303B and mounting position 287B. The insulation cutting knife 291B is slidably received in knife slot 306B and is slidably retained therein by retainer plate 311B. The retainer plate 311B is secured on the retainer block 303B by means of a pair of cap screws 312B.

A first actuating means 370 (FIG. 14) is provided for effecting movement of the cutting knives 291A, 291B to a closed position to transversely cut the insulation and create a cut portion of insulation at the end of each wire segment. The first actuating means for each of the upper and lower knives is best shown in FIGS. 14 and 25. As the first actuating means for the upper knife is the same as the first actuating means for the lower knife, only the upper first actuating means will be described. The upper first actuating means includes an upper transducer 371B having a piston rod 372B projecting downwardly therefrom. The end of the piston rod 372B is threaded into an aperture in a block 313B having a T-slot 314B provided therein. The first actuating means also includes a slide member 316B having a knife receiving mortice 318B therein and a pair of internally threaded apertures 321B, 322B in the upper side thereof as shown in FIG. 25. A T-bolt 323B is threaded into the aperture 321B in slide member 316B. A second stop means, comprising headless screw 324B, is threaded into aperture 322B. The head of T-bolt 323B is slidably received in the T-slot 314B of block 313B.

The knife 291B includes a knife attaching means in the form of a tenon 319B which is slidably received in the mortice 318B in the slide member 316B. A biasing spring 324B surrounds the upper end of the knife 291B to constantly bias the knife against the end of second stop member 324B which is threadably received in the aperture in slide member 316B. The second stop means 324B is threaded into aperture 322B a selected distance to set the gap between the upper and lower knives 291A, 291B when they are closed. When the knives are set to the proper gap as determined by the second stop means screws 324A, 324B (FIG. 14), set screws 327A, 327B are tightened to lock the second stop means at the desired position.

A second actuating means 380 is provided for effecting movement of a wire gripping and guide means 341 between an open and a closed position and is best shown in FIGS. 25 and 26. Only the construction of the upper second actuating means and the upper gripping and guiding means 341 will be described as the lower counterparts of both means are identical in construction. The second actuating means 380 comprises the upper connecting rod 308B. The gripping and guiding means includes jaws 342B which are connected to one end of the connecting rod 308B. The jaws 342B may be integral with or attached to the connecting rod 308B. The other end of the connecting rod 308B is fixedly secured in a slot 343B provided in slide member 316B member by means of a lock plate 344B and cap screws 346B which pass through notches 345B in the top portion of connecting rod 308B. A coil spring 347B surrounds the connecting rod 308B and is interposed between the slide member 316B and the retainer block 303B to constantly bias the slide member and the retainer block apart.

The apex 332B of the cutting profile of each knife, such as knife 291B, is ground in a semicircular shape which is slightly larger than the diameter of the conductor of the insulated wire segment it is designed to cut. The upper and lower knife members are aligned to be in face-to-face slide-by relationship as shown in FIG. 27 and when they reciprocate towards and away from each other their semicircular profiles coact to form a circular cutting edge which will cut through the insulation but which will not cut or score the wire conductor. The knife profiles on each mating pair of upper and lower knives at each mounting position on the turret will be semicircular but each pair will have a different dimension of cutting profile with each profile specifically sized to cut the insulation on a wire segment having a different gauge conductor.

The transducers of the actuating means can be air, electric or hydraulically actuated single or double acting piston cylinder assemblies. The upper and lower knives will be moved toward the open noncutting position or the closed cutting position in response to actuation of the first actuating means as will be more fully described hereinafter.

Referring to FIG. 15, a lower proximity sensor PS3 is mounted on the lower portion 237 of carriage second subframe 235 adjacent the lower slide member 316A. An upper proximity sensor PS4 is mounted on the upper portion 249 of carriage second subframe adjacent to the upper slide member. The proximity sensors PS3 and PS4 provide reference signals to the CPU to identify that the knives 291A and 291B have closed and thus cut the insulation to indicate that the second subframe 235 can be moved in the direction of arrow 240A (FIGS. 27, 28, 29) to cause the cut insulation to be stripped from the wire segment.

A wire gathering and clamping means 350, as best shown in FIGS. 15, 19, 20 and 27, is mounted on the carriage first subframe 232. The wire gathering and clamping means 350 includes a support frame 351 having a lower portion 352 secured by bolts 353 to the first slide plate 233 of the first subframe 232. The support frame 351 includes an upper arm 354, an intermediate arm 356 and a lower arm 357. The upper arm 354 supports a fourth actuating means 370 which includes a transducer 358. The intermediate arm 356 slidably supports a wire gathering means slide element 359 which has a wire gathering clamp 361 mounted at the lower end thereof. The lower arm 357 supports a wire support ramp 362. The wire gathering clamp 361 comprises a pair of spaced apart plate members each having a V-shaped profile 364 terminating in a wire clamping notch 365 at the apex thereof. The clamp slide element 359 is connected to a piston rod 366 of the fourth actuating means transducer 358 by a coupling 367. The wire gathering clamp 361 is normally in the open nonwire gathering position shown in FIG. 15. As the conveyor 217 brings wire segments to the workstation WS, the fourth actuating means is energized to cause the wire gathering clamp 361 to move downward in the direction of arrow 368 to gather the wire segment (or segments) and clamping it against the wire support ramp 362 where it is held in a fixed position for the subsequent cutting and stripping of the insulation therefrom.

OPERATION OF THE SECOND EMBODIMENT

The operation of the second embodiment will now be explained with reference to FIGS. 29 and 30. The apparatus disclosed in FIGS. 13–28 is under the direction of the central processing unit CPU. The following description presupposes that a wiring harness utilizing wire segments of several different conductor gauges requiring different strip lengths of bare conductors is required and therefore the position of the turret 276 and first and second subframes 232, 235 must be adjusted. The sequence which the wire selector/feed mechanism 214 will follow in presenting wire segments 218 having different gauges of conductors to the conveyor is programmed into the CPU as is the stripped length of bare conductor for each of the wire segments. In addition, the type of terminal to be attached to the stripped end by the terminal attachment machine is also programmed into the CPU. If the insulation portion on any given wire segment is to be cut but not removed, this is also programmed into the CPU and, if desired, the CPU can be programmed to instruct the terminal attachment machine not to apply a terminal to any given wire segment. The conveyors 216, 217 will receive the cut wire segments 218 in the programmed sequence and will carry each wire segment to the workstation WS of the programmable stripper which is functionally illustrated in the schematic of FIG. 29. The wire gathering and clamping means 350, the cutting means 301A, 301B, and the gripping and guiding means 341 are all in the open position shown in FIG. 26. One complete cycle of operation of the programmable stripper for one wire segment 218 is illustrated in FIG. 30. The cycle begins as the wire segment 218 is presented at the workstation WS shown in FIG. 13. As the wire segment is presented at the workstation, the fourth actuating means 370 is energized to move the gathering and clamping means 350 to the closed position, shown in FIG. 27, which centers and clamps the wire segment 218 or segments if there are more than one to be stripped at one time against the wire support ramp 362. The cutting means 301A, 301B and gripping and guiding means 341 remain open in the position shown in FIG. 26. The CPU unit then energizes the second drive means step motor 292 to move the turret 276 in the required direction to select the proper set of knives 291A, 291B for cutting and stripping the gauge of the wire segment currently presented at the workstation WS. As shown in FIG. 30, this turret position is then held through the remainder of the cycle. In the second embodiment, there are seven different sets of knives carried by the turret so seven different gauges of wiring segments could be used in a wiring harness.

At the same time the position of turret 276 is being selected, the step motor 259 of the first drive means 258 is also being energized to move the first subframe 232 in a direction of arrow 274A or 274B to move the cutter knives toward or away from the workstation WS to a position required by the length of insulation which is to be cut and stripped from the end of the wire segment. This strip length position of the first subframe 232 is also held through the remainder of the cycle as shown in FIG. 30.

Immediately after the turret and carriage first subframe positions have been selected, the CPU will energize the first actuating means transducers 371A, 371B to move the cutter knives 291A and 291B in the direction of arrows 379 to a closed insulation cutting position shown in FIG. 27. Energization of the first actuating means 370 will also automatically energize the second actuating means 380 to simultaneously move the gripping and guiding means 341 to the closed position to keep the free end of the wire segment 218 in generally coaxial alignment with the remainder of the wire segment as shown in FIG. 27. With the knives 291A, 291B in the closed cutting position and the gripping and guiding means closed, CPU will energize the third actuating means transducer 292 to only move the second subframe 235 in the direction of arrow 240A to the position shown in FIG. 28 with the closed knives abutting the end of the cut insulation to cause the insulation slug to be axially slid off of the end of the wire segment 218. The knives 291A and 291B remain closed around the conductor and move along the conductor to cause the insulation slug to be stripped. The gripping and guiding means 341 also remain closed to guide the insulation as it is being stripped. If the insulation slug is not to be removed, the CPU will not energize the third actuating means. After the insulation slug has been actually withdrawn off the end of the conductor of the wire segment, CPU will energize the first and second actuating means to open the cutter knives and the gripping and guiding means so that the insulation slug can be ejected from between the jaws 342A and 342B. After both the gripping and guiding means and the cutter knives have been returned to their open position, the CPU will again energize the third actuating means to move the second subframe 235 in the direction of arrow 240B arrow back to the workstation to place the cutting means and gripping and guiding means in a reset position ready for the next cycle.

After the end of the wire segment has been stripped to the appropriate length, the conveyors 216 and 217 will carry the stripped wire segment 218 to the terminal attaching machines 219 where the CPU directs the attachment of the proper terminal end or directs that no terminal be applied.

The apparatus would function in the same manner as above described if batches of wire segments with each batch having conductors all of the same gauge were being processed. In this situation the turret will be initially moved to place the proper knives at the workstation and then will not be moved until a subsequent batch of wire segments of different gauge is presented at the workstation. Similarly, if the stripped portion is to be of the same length for all wire segments in a given batch, the position of the first subframe 232 will be initially adjusted and then not moved until all wire segments of a batch are stripped.

What is claimed is:

1. A programmable stripper for cutting or cutting and removing selectively variable length insulation portions from the ends of insulated wire segments (218) sequentially presented at a workstation (WS) comprising:
  a base frame (21, 221) mountable in fixed relation to said workstation;
  a carriage (31, 231) mounted on said base frame for movement in a first plane (P1) toward and away from said workstation;
  a first drive means (58, 258) operatively interposed between said base frame and said carriage for moving said carriage to positions closer or farther from said workstation as required by the length of said insulation portion to be cut;
  a turret (76, 276) mounted on said carriage for movement relative thereto and having,
    a plurality of individual mounting positions (87, 287), and
    an insulation cutting means (101A, 101B, 301A, 301B) including a knife means (91A, 91B, 291A, 291B) mounted on said turret at each of said mounting positions, said knife means movable between an open noncutting position and a closed insulation cutting position wherein a wire receiving gap exists in said knife means, a second drive means (90, 290) for selectively moving said turret relative to said carriage to place any selected one of said cutting means, when in said open position, at said workstation;

a first actuating means (170, 370) for effecting cutting movement of said cutting means to said closed position to transversely cut said insulation and create a cut portion of insulation at the end of said wire segment;

gripping and guiding means (141, 341) mounted on said carriage and movable between an open position and a closed position relative to said cut portion of insulation;

a second actuating means (180, 380) for effecting said movement of said gripping and guiding means between said open and closed positions; and a third actuating means (190, 390) for effecting movement of said gripping and guiding means toward said workstation when said gripping means is in said open nongripping position and away from said workstation when said gripping means is in said closed gripping position during stripping of said cut portion of insulation.

2. A programmable stripper according to claim 1 wherein:
said turret (76, 276) comprises a sector (77, 277) mounted on said carriage for movement about a pivot axis;
said sector has a radially outward facing circumferential portion (86A, 86B, 286A, 286B); and
said plurality of individual mounting positions (87, 287) are located on said outward facing circumferential portion of said sector.

3. A programmable stripper according to claim 2 wherein said turret sector is mounted for movement about a pivot axis (43, 243) that extends at an angle to said first plane in which said carriage moves.

4. A programmable stripper according to claims 3 wherein said sector (77, 277) lies in a second plane (P2) which is in spaced parallel relation to said first plane (P1).

5. A programmable stripper according to claim 2 wherein:
said sector (77, 277) comprises a pair of spaced apart lower and upper sectors (77A, 77B, 277A, 277B) mounted on said carriage (31, 231) for pivotal movement, in unison, relative thereto;
said lower sector (77A, 277A) having lower individual mounting positions (87A, 287A) thereon;
said upper sector (77B, 277B) having upper individual mounting positions (87B, 287B) thereon;
said lower mounting positions on said lower sector being in vertical alignment with said upper mounting positions on said upper sector;
said lower sector is positioned on said carriage to present each of said lower mounting positions below said workstation as said lower sector is pivoted;
said upper sector is positioned on said carriage to present each of said upper mounting positions above said workstation as said upper sector is pivoted; and
said insulation cutting means (101A, 101B, 301A, 301B) includes,
a lower knife (91A, 291A) at each of said mounting positions on said lower sector,
an upper knife (91B, 291B) at each of said mounting positions on said upper sector, a knife mounting means (102A, 102B, 302A, 302B) for mounting said lower and upper knives at each of said mounting positions for reciprocal movement toward and away from each other, and a knife stop means (110A, 110B, 324A, 324B) for limiting reciprocal movement of said upper and lower knives toward each other when said first actuating means is energized, and a first actuating means (170, 370) for reciprocating said lower and upper knives toward and away from each other.

6. A programmable stripper according to claim 5 wherein:
said upper sector and lower sectors lie in spaced apart second and third planes (P2, P3) which are parallel to each other and to said first plane, and
said gripping and guiding means (141) is mounted between said upper and lower sectors.

7. A programmable stripper according to claim 6 wherein said turret sectors (77A, 77B) are mounted for movement about a pivot axis (43) that extends at an angle to said first plane (P1) in which said carriage (31) moves and wherein said gripping and guiding means (141) is mounted to move transversely toward and away from said pivot axis.

8. A programmable stripper according to claim 2 wherein said insulation cutting means includes a knife mounting means (102) at each of said individual mounting positions includes:
a guide means (104B) on said sector;
a slide member (106B, 107B) mounted on said guide means for reciprocal movement between said open noncutting and closed cutting positions;
knife attaching means (118B) on said slide member for securing said knife member (91B) thereto;
a knife guide means (122B, 123B) mounted on said sector at each said mounting positions for guiding said reciprocating knife;
a first stop means (116B) for determining said open noncutting position of said slide member;
a slide member biasing means (113B) for biasing said slide member against said first stop means; and
a second stop means (110B) for limiting reciprocating movement of said slide member and associated knives toward said closed cutting position.

9. A programmable stripper according to claim 8 wherein: said first stop means comprises;
a retainer pin aperture (112B) in said sector (77B) adjacent each of said mounting positions;
a slide member retainer pin (111B) having first and second portions;
said first portion slidably mounted in said retainer pin aperture in said sector;
said second portion secured to said slide member (106B); and
said slide member biasing means comprises a compression spring (113B) surrounding each of said retainer pins between said slide member and said sector.

10. A programmable stripper according to claim 8 wherein said means for attaching said knife member (91B) to said slide member (106B) comprises a mortice (118B) on one of said members and a mating tenon (119B) on the other of said members.

11. A programmable stripper according to claim 5 wherein said knife mounting means (102) at each of said mounting positions includes:

a lower guide means (104A) on said lower sector (77A);

a upper guide means (104B) on said upper sector (77B);

a lower slide member (106A) reciprocally mounted on said lower sector guide means and a upper slide member (106B) reciprocally mounted on said upper sector guide means for reciprocal movement between said open noncutting and closed cutting positions;

knife mounting means (102A, 102B) on each of said slide members for securing said knife member thereto;

a knife guide means (122A, 123A) mounted on said lower and upper sectors at each said mounting positions for guiding said reciprocating knife;

a first stop means (116B) for determining said open noncutting position of said upper and lower slide members;

a biasing means (113A, 113B) for biasing said upper and lower slide members against said first stop means; and a second stop means (110A, 110B) for limiting reciprocating movement of said upper and lower slide members toward each other to said closed cutting position.

12. A programmable stripper according to claim 11 wherein:

said lower guide means comprise a lower aperture means (104A) in said lower sector;

said upper guide means comprise an upper aperture means (104B) in said upper sector;

said lower guide member includes a lower slide pin means (107A) slidably mounted in said lower aperture means; and said upper guide member includes an upper slide pin means (107B) slidably mounted in said upper aperture means.

13. A programmable stripper according to claim 11 wherein:

said lower slide pin means (107A) includes a lower free end means (110A); and said upper slide pin means (107B) includes an upper free end means (110B) contactable with said lower free end means to constitute said second stop means.

14. A programmable stripper according to claim 12 wherein:

said lower and upper aperture means (104A, 104B) each comprise a pair of apertures that pass through said lower and upper sectors respectively with said lower apertures being in alignment with said upper apertures;

said lower slide pin means comprises a pair of lower pins (107A) extending through said lower apertures and having lower free ends (110A) terminating in said space between said lower and upper sectors;

said upper slide pin means comprises a pair of upper pins (107B) extending through said upper apertures and having upper free ends (110B) terminating in said space between said upper and lower sectors in face-to-face relation with said lower free ends; and said lower and upper free ends contactable with each other during said reciprocal movement of said upper and lower guide members to constitute said second stop means.

15. A programmable stripper according to claim 14 wherein one of said slide pin means (107B) is adjustably mounted in its associated slide member (106B) for movement toward and away from said slide member.

16. A programmable stripper according to claim 5 wherein said gripping and guiding means (141) is normally biased to said open position, and wherein said second actuating means (180) for effecting movement of said gripping and guiding means includes:

a lower plunger (183A) slidably mounted in said lower sector (77A) adjacent each of said lower individual mounting positions and an upper plunger (183B) slidably mounted in said upper sector (77B) adjacent each of said upper individual mounting positions;

said plungers movable between a first position in contact with said gripping and guiding means to move said gripping and guiding means to said closed position and a second position allowing said gripping and guiding means to assume said open position;

a plunger biasing means (184A, 184B) for normally biasing each of said plungers to said second position; and a second actuator means (181A, 182A and 181B, 182B) for moving said lower and upper plungers.

17. A programmable stripper for cutting and removing selectively variable length insulation portions (18A) from the ends of insulated wire segments (18) presented at a workstation (WS) comprising:

a base frame (21) mountable in fixed relation to said workstation;

a carriage (31) mounted on said base frame for movement in a first plane (P1) toward and away from said workstation and having, a lower portion (37), a shaft means (43) mounted on said lower portion and projecting therefrom, an upper portion (49) mounted on said shaft in spaced relation to said lower portion, a turret (76) including spaced apart lower and upper sectors (77A, 77B) mounted on said shaft between said lower and upper portions for pivotal movement relation to said shaft, said lower sector having a plurality of individual lower mounting positions(87A), thereon, said upper sector having a plurality of individual upper mounting positions (87B) thereon each of which is aligned with one of said lower mounting positions, a lower insulation cutting means (101A) reciprocally mounted on each of said lower mounting positions, and an upper insulation cutting means (101B) reciprocally mounted on each of said upper mounting positions, each of said cutting means movable between an open noncutting position and a closed cutting position, a gripping and guiding means (141) mounted on said shaft between said lower and upper turret sectors, said gripping and guiding means movable between open and closed positions and shiftable toward and away from said workstation, a first drive means (58) operatively interposed between said base frame and said carriage for moving said carriage toward and away from said workstation in response to the length of said insulation portion to be cut, a second drive means (91) for selectively moving said turret sectors simultaneously relative to said shaft to place any selected one of said mounting positions at said workstation, a first actuating means (170) comprising a lower cutting means actuator (171A) mounted on said carriage lower portion and an upper cutting means actuator (171B) mounted on said carriage upper portion for effecting movement of said cutting means between said open noncutting and closed cutting positions, a second actuating means (180) comprising a lower gripping and guiding means actuator (181A) mounted on said carriage lower portion and an upper gripping and guiding means actuator (171B) mounted on said carriage upper portion for effecting movement of said gripping and guiding means between said open and closed positions, and a third actuating means (190) mounted on said carriage for effecting movement of said gripping and guiding means toward and away from said workstation.

18. A programmable stripper according to claim 17 wherein:
said shaft (43) extends at a right angle relative to said first plane (P1);
said lower portion (37) extends in a direction toward said workstation, and
said upper portion (49) comprises a cantilever extending from said shaft in a a direction parallel to said direction of said lower portion.

19. A programmable stripper according to claim 17 wherein each of said sectors has an included arc of 90°.

20. A programmable stripper according to claim 18 wherein:
said lower and upper gripping and guiding means actuators (181A, 181B) are in vertical alignment with each other and in spaced parallel relation to said shaft (43);
said lower and upper cutting means actuators (171A, 171B) are in vertical alignment with each other and in spaced parallel relation to said shaft (43); and
said lower and upper gripping and guiding means actuators are located between said lower and upper cutting means actuators and said shaft.

21. An apparatus for cutting, and conveying insulated wire segments (18, 218) having conductors of the same or differing gauges to a workstation (WS) and for removing variable length insulation portions from the ends of said wire segments, said apparatus comprising:
means (14, 214) for cutting said wire segments having same or differing gauge conductors;
conveying means (16, 17, 216, 217) for conveying said cut wire segments and presenting said ends at a workstation; and
a programmable wire stripper (12, 212) mounted at said workstation, said programmable stripper including;
a base frame (21, 221) mounted in fixed relation to said workstation,
a carriage (31, 231) mounted on said base frame for movement in a first plane (P1) to strip length positions closer or farther from said workstation as required by the length of said insulation to be cut,
a first drive means (58, 258) operatively interposed between said base frame and said carriage for moving said carriage to a predetermined one of said strip length positions, a turret (76, 276) mounted on said carriage for movement relative thereto and having a plurality of mounting positions (87, 287), an insulation cutting means (101A, 101B, 301A, 301B) mounted on said turret at each of said mounting positions and movable between open insulation noncutting and closed insulation cutting positions, a second drive means (90, 290) for selectively moving said turret relative to said carriage to place any selected one of said cutting means when in said open noncutting position at said workstation, a first actuating means (170, 370) for effecting cutting movement of said cutting means to said closed cutting positions to transversely cut said insulation and create a cut portion of insulation at said end of said wire segment, gripping and guiding means (141, 341) mounted on said carriage and movable between open and closed positions relative to said cut portion of insulation, a second actuating means (180, 380) for effecting selective movement of said gripping and guiding means to said open and closed positions, and a third actuating means (190, 390) for effecting movement of said gripping and guiding means toward said workstation when said gripping and guiding means is in said open position and away from said workstation when said gripping means is in said closed position.

22. A programmable stripper according to claim 1 wherein:
said carriage (231) comprises:
a first subframe (232) mounted on said base frame (221) for movement relative thereto toward and away from said workstation,
a second subframe (235) mounted on said first subframe for movement relative thereto and relative to said base frame toward and away from said workstation;
said first drive means (258) is operatively mounted between said base frame and said first subframe for moving said first and second subframes to position closer or farther from said workstation;
wherein said third actuating means (390) is operatively mounted between said first subframe and said second subframe for effecting said movement of said gripping and guiding means toward and away from said workstation.

23. A programmable stripper according to claim 22 wherein:
said turret (276) is mounted on said second subframe (235); and
said second drive means (290) is mounted between said second subframe and said turret for moving said turret relative to said second subframe.

24. A programmable stripper according to claim 23 wherein:
said gripping and guiding means (341) is mounted on said second subframe (235); and
said third actuating means (390) is mounted between said first subframe and said second subframe for effecting said movement of said gripping and guiding means toward and away from said workstation.

25. A programmable stripper according to claim 22 wherein said turret (276) comprises a pair of spaced apart lower and upper sectors (277A, 277B) mounted on said second subframe for pivotal movement in unison relative thereto;

said lower sector (277A) having lower individual mounting positions (287A) thereon;

said upper sector (277B) having upper individual mounting positions (287B) thereon;

said lower mounting positions on said lower sector being in vertical alignment with said upper mounting positions on said upper sector;

said lower sector is positioned on said carriage to present each of said lower mounting positions below said workstation as said lower sector is pivoted;

said upper sector is positioned on said carriage to present each of said upper mounting positions above said workstation as said upper sector is pivoted; and said insulation cutting means (301A, 301B) includes,
   a lower knife (291A) at each of said mounting positions on said lower sector,
   an upper knife (291B) at each of said mounting positions on said upper sector,
   a knife mounting means (302A, 302B) for mounting said lower and upper knives at each of said mounting positions in opposing relation to each other, and
   a knife stop means (324A, 324B) for limiting reciprocal movement of said lower and upper knives toward each other when said first actuating means is energized.

26. A programmable stripper according to claim 25 wherein:
   said upper sector and lower sectors lie in spaced apart second and third planes (P2, P3) which are parallel to each other and to said first plane, and
   said gripping and guiding means (341) includes a gripping and guiding member (342A, 342B) reciprocally mounted on each of said upper and lower sectors, said gripping and guiding members being between said upper and lower sectors and in opposed facing relation to each other.

27. A programmable stripper according to claim 25 wherein said turret sectors (277A, 277B) are mounted for movement about a pivot axis (243) that extends at an angle to said first plane (P1) in which said carriage (231) moves.

28. A programmable stripper according to claim 25 wherein said knife mounting means (302) includes:
   a guide means (303A, 303B) mounted on each of said sectors at each of said mounting positions, said guide means having a first guide means (306A, 306B) for guiding each of said reciprocating knives and a second guide means (307A, 307B) for guiding said gripping and guiding means;
   a slide member (316A, 316B) mounted on said guide means for reciprocal movement between said open noncutting and closed cutting positions;
   knife attachment means (318B) on said slide member for securing said knife member (291B) thereto; and
   a second stop means (324B) for limiting reciprocating movement of each of said slide members and associated knife toward said closed cutting position.

29. A programmable stripper according to claim 28 wherein said means for attaching said knife member to said slide member comprises a mortice (318B) on one of said members and a mating tenon (319B) on the other of said members.

30. A programmable stripper according to claim 28 wherein said second stop means (324B) comprises an adjustable member mounted on each of said slide members (316B) for contact with said knife means (291B) when the latter is in said closed cutting position, said adjustable member being selectively movable toward and away from said knife means to determine the size of said wire receiving gap between said opposed lower and upper knives.

31. A programmable stripper according to claim 28 wherein
   said knife guide means comprises a first vertically extending slot (306B) in said guide means for slidably receiving said knife therein; and
   said gripping and guiding means comprises a second vertically extending slot (307B) in said guide means for slidably receiving said gripping and guiding means therein.

32. A programmable stripper according to claim 31 wherein:
   said first actuating means (370) is mounted between said second subframe (235) and said slide member (316B) and selectively operable to reciprocate said slide member, and
   said second actuating means (380) is operatively connected between said slide member (316B) and said gripping and guiding means (341) and operable in response to energization of said first actuating means to move said gripping and guiding means to said closed position relative to said cut portion of insulation which is to be stripped from said wire segment.

33. A programmable stripper according to claim 22 wherein:
   a wire gathering means (350) is mounted on said first subframe (232) at said workstation in spaced relation adjacent said insulation cutting means (301A, 301B) for movement between an open position out of contact with said wire segment and a clamping position wherein said wire segment is gathered and held in a fixed position at said workstation; and
   a fourth actuating means (358) for selectively moving said wire gathering means between said open and clamping positions.

* * * * *